United States Patent [19]

Loftin et al.

[11] Patent Number: 5,311,422

[45] Date of Patent: May 10, 1994

[54] GENERAL PURPOSE ARCHITECTURE FOR INTELLIGENT COMPUTER-AIDED TRAINING

[75] Inventors: R. Bowen Loftin, Houston; Lui Wang, Friendswood; Paul T. Baffes, Houston; Grace C. Hua, Webster, all of Tex.

[73] Assignee: The United States of America as represented by the Administrator of the National Aeronautics and Space Administration, Washington, D.C.

[21] Appl. No.: 545,235

[22] Filed: Jun. 28, 1990

[51] Int. Cl.⁵ .................................................. G06F 15/52
[52] U.S. Cl. ...................................... 364/401; 364/578
[58] Field of Search ................ 364/578; 434/224, 335, 434/262; 395/23, 50, 53, 68

[56] References Cited

U.S. PATENT DOCUMENTS

| | | | |
|---|---|---|---|
| 3,311,995 | 4/1967 | Hudson | 35/12 |
| 4,337,048 | 6/1982 | Hatch et al. | 434/219 |
| 4,538,994 | 9/1985 | Suzuki et al. | 434/219 |
| 4,545,767 | 10/1985 | Suzuki et al. | 434/224 |
| 4,613,952 | 9/1986 | McClanahan | 364/578 |
| 4,622,013 | 11/1986 | Cerchio | 434/118 |
| 4,623,312 | 11/1986 | Crawford | 434/224 |
| 4,730,259 | 3/1988 | Gallant | 364/513 |
| 4,776,798 | 10/1988 | Crawford | 434/224 |
| 4,905,163 | 2/1990 | Garber et al. | 395/63 |
| 4,907,973 | 3/1990 | Hon | 436/262 |
| 4,949,267 | 8/1990 | Gerstenfeld et al. | 364/439 |
| 4,964,125 | 10/1990 | Kim | 371/15.1 |
| 4,965,743 | 10/1990 | Malin et al. | 364/513 |
| 4,977,529 | 12/1990 | Gregg et al. | 364/578 |
| 4,979,137 | 12/1990 | Gerstenfeld et al. | 364/578 |
| 5,016,204 | 5/1991 | Simoudis et al. | 364/578 |
| 5,101,362 | 3/1992 | Simoudis | 395/53 |

OTHER PUBLICATIONS

"An Intelligent Training System for Payload-Assist Module Deploys," R. B. Loftin, L. Wang, P. Baffes & M. Rua, Proceedings of the First Annual Workshop on Space Operations Automation, and Robotics, Aug. 5-7, 1987, National Aeronautics and Space Administration, Lyndon B. Johnson Space Center, Houston, Tex., pp. 53-59.

"An Intelligent Training System for Payload-Assist Module Deploys," R. B. Loftin, L. Wang, P. Baffes & M. Rua, Proceedings of the SPIE 1987 Cambridge Symposium on Advances in Intelligent Robotics Systems, Nov. 1-6, 1987, Cambridge, Mass., pp. 83-89.

(List continued on next page.)

Primary Examiner—Roy N. Envall, Jr.
Assistant Examiner—A. Bodendorf
Attorney, Agent, or Firm—Hardie R. Barr; Guy M. Miller; Edward K. Fein

[57] ABSTRACT

A training system for use in a wide variety of training tasks and environments comprising a user interface simulating the same information available to a trainee in the task environment which allows the trainee to assert actions to the system; a domain expert which can use the same information available to the trainee and carry out the same task; a training session manager for evaluating such trainee assertions and providing guidance to the trainee appropriate to his acquired skill level; a trainee model which contains a history and summary of the trainee actions; an intelligent training scenario generator for designing increasingly complex training exercises based on the current skill level and any weaknesses or deficiencies that the trainee has exhibited in previous interactions; and a blackboard that provides a common fact base for communication between the other components of the system. The domain expert contains a list of "mal-rules" which typifies errors usually made by novice trainees. Also, the training session manager comprises "intelligent" error detection and error handling components. The present invention utilizes a rule-based language having a control structure using a specific message passing protocol for tasks which are procedural or step-by-step in structure. The trainee may reach "the solution" by any of a number of alternate valid paths.

29 Claims, 35 Drawing Sheets

OTHER PUBLICATIONS

"An Intelligent Training System for Space Shuttle Flight Controllers," R. B. Loftin, L. Wang, P. Baffes, & G. Hua, Proceedings of the 1988 Goddard Conference on Space Applications of Artificial Intelligence, May 24, 1988, NASA Goddard Space Flight Center, Greenbelt, Md., pp. 3-15.

"An Intelligent Training System for Space Shuttle Flight Controllers," R. B. Loftin, L. Wang, P. Baffes, & G. Hua, Informatics and Telematics, vol. 5, No. 3, pp. 151-161.

"Simulation Scienaro Generation for Intelligent Training Systems," R. B. Loftin, L. Wang, & P. Baffes, Proceedings of the Third Artificial Intelligence and Simulation Workshop, Aug. 22, 1988, St. Paul, Minn., pp. 69-74.

"An Intelligent Training System for Space Shuttle Flight Controllers," R. B. Loftin, L. Wang, P. Baffes & G. Hua, Proceedings of the 1989 American Association for Artificial Intelligence Conference on Innovative Applications of Artificial Intelligence, Mar. 28-30, 1989, Stanford University, pp. 1-8.

pd-i-cat

Welcome to 𝔓𝔇-𝔍𝔆𝔄𝔗!

THIS IS AN INTELLIGENT TRAINING SYSTEM DESIGNED TO AID FLIGHT DYNAMICS OFFICERS IN LEARNING TO PERFORM PAM DEPLOYS. THE SYSTEM PROVIDES COMPLETE TRAINING SCENARIOS WHICH BEGIN WITH THE PRELIMINARY DETERMINATION OF THE DEPLOY TIME AND CONTINUE THROUGH THE PREPARATION OF ALL FINAL PADS.

IN ADDITION TO TRAINING FLIGHT DYNAMICS OFFICERS, THIS SYSTEM PROVIDES AN INTERACTIVE TRAINEE EVALUATOR THAT ALLOWS A USER TO FIND OUT THE STATUS OF A TRAINEE AT A GENERAL LEVEL. ALSO, A TRAINEE CAN GENERATE A REPORT AT THE END OF THEIR TRAINING SESSION THAT SHOWS A DETAILED LISTING OF ERRORS AND STATISTICS ON THE SESSION.

PLEASE ENTER YOUR NAME

ZZZ

NASA
MPAD-AI

FIG. 2A

pd-i-cat

SUMMARY REPORT

TOP

6/28/89 15:50:00
ZZZ, THIS IS TRAINING SESSION #0. THE LENGTH OF THIS SESSION WAS 0:13:15.00 AND YOU COMPLETED TWENTY GOALS. THIRTY-EIGHT ERRORS WERE MADE, AND YOU RECEIVED HELP ZERO TIMES.

THE FOLLOWING IS A SUMMARY TRACE OF THIS SESSION
GET THE STATUS OF THE NAV VECTOR
SET THE SIGN OF THE PKM OFFSET
ENTER THE PKM OFFSET DAYS-HOURS-MINUTES-SECONDS
ENTER THE PAYLOAD SPRING DELTA-V
ENTER THE DECLINATION OF THE SPIN AXIS
ENTER THE PKM OFFSET IN SECONDS
ENTER THE RELATIVE RIGHT ASCENSION OF THE SPIN AXIS
ENTER THE PKM OFFSET DAYS-HOURS-MINUTES-SECONDS

---BACK UP---

GET THE STATUS OF THE NAV VECTOR
CONFIGURE VECTOR COMPARISON DISPLAY
NOT TAKEN.
PUT NAV VECTOR INTO VAT SLOT
CONFIGURE VECTOR COMPARISON DISPLAY
NOT TAKEN.
ANCHOR EPHEMERIS

MORE BELOW

FIG. 2B

```
TRAINEE TEMPLATE-1
    ├── NAME                    CSV
    ├── STEP TEMPLATE LIST      (<STEP-TEMPLATE-1>
    │                            <STEP-TEMPLATE-2>...)
    ├── STEP SEQUENCE           ( CSV-1 CSV-2....)
    ├── SESSION LEVEL           CSV
    ├── START TIME              CSV
    └── HISTORY LIST            (<TRAINEE TEMPLATE>...)

STEP-TEMPLATE-1
    ├── NAME                    CSV
    ├── ACTION TEMPLATE         <ACTION-TEMPLATE-1>
    └── HELP DEFINITION         <HELP-DEFINITION-1>

ACTION-TEMPLATE-1
    ├── REQUIRE ACTION          <ACTION-DESCRIPTION-1>
    └── OPTIONAL ACTIONS        (<ACTION-DESCRIPTION-2>
                                 <ACTION-DESCRIPTION-3>
                                 ....)
```

FIG. 5A

<ACTION DESCRIPTION>
- ACTION NAME — CSV
- ERROR CATEGORY — <ERROR CATEGORY-1>

<ERROR-CATEGORY-1>
- GENERAL OUT OF CONTEXT FORWARD — CSV
- SPECIFIC OUT OF CONTEXT FORWARD — CSV
- GENERAL OUT OF CONTEXT BACKWARD — CSV
- SPECIFIC OUT OF CONTEXT BACKWARD — CSV
- GENERAL BAD ARGUMENT — CSV
- SPECIFIC BAD ARGUMENT — CSV
- SPECIAL AVOID — CSV
- NOT TAKEN — CSV
- UNKNOWN — CSV

<HELP-DEFINITION-1>
- EXPLAIN LAST CONTEXT — CSV
- EXPLAIN CURRENT CONTEXT — CSV
- EXPLAIN DEPENDENCY — CSV
- HINT — CSV
- BACKUP TO LAST CONTEXT — CSV
- EXPLAIN LAST CONTEXT — CSV
- EXPLAIN LAST CONTEXT — CSV

FIG. 5B

THE FOLLOWING LISTS ARE NOT EXCLUSIVE; THE SYSTEM DESIGN CAN SUPPORT ADDITIONAL ITEMS THAT MIGHT BE DEEMED IMPORTANT FOR DIFFERENT TRAINING TASKS/ENVIRONMENTS.

*THE MENU ITEMS AVAILABLE ARE:

LIST OF ACTIVE TRAINEES
    PROFILE OF PROGRESS
        BAR CHART SHOWING NUMBERS OF TRAINEES AT EACH COMPETENCY LEVEL
    LIST OF TRAINEES BY LEVEL
        COMPETENCY LEVEL GROUPINGS OF ACTIVE TRAINEES
    LIST OF TRAINEES BY TRAINING TIME
    LIST OF TRAINEES BY NUMBER OF SESSIONS COMPLETED
    GRAPH OF AVERAGE TIME PER SESSION VS. SESSION NUMBER
    PROFILE OF ERROR TYPES
        BAR CHART SHOWING NUMBERS OF TRAINEES MAKING EACH TYPE OF ERROR WITH A SELECTABLE FREQUENCY

**THE MENU ITEMS AVAILABLE ARE:

NUMBER OF SESSIONS COMPLETED
    COMPETENCY LEVEL
    TOTAL TRAINING TIME
    AVERAGE NUMBER OF ERRORS PER SESSION
    GRAPH OF SESSION LENGTH VS. SESSION NUMBER
    GRAPH OF ERROR NUMBER VS. SESSION NUMBER
    GRAPH OF NUMBER OF HELP REQUESTS VS. SESSION NUMBER
    ERROR PROFILE
        BAR CHART SHOWING NUMBER OF ERRORS BY TYPE
    TIME AND SESSIONS AT EACH COMPETENCY LEVEL

***THE MENU ITEMS AVAILABLE ARE:

LIST OF ALL SCENARIO PARAMETERS
    LIST OF NON-NOMINAL PARAMETERS
    SESSION LENGTH
    NUMBER OF ERRORS
    LIST OF ALL ERRORS
    LIST OF NUMBER OF ERRORS BY TYPE
    LIST OF NUMBER OF ERRORS BY ACTION CATEGORY
    LIST OF BAD ARGUMENTS FOR SELECTED ACTION CATEGORY
    COMPETE TRACE OF SESSION
        BY EXPERT'S SEQUENCE
        BY TRAINEE'S ACTUAL SEQUENCE
    LIST OF HELP REQUESTS
    LIST OF TAKE ACTION REQUESTS
    LIST OF EXPLAIN STEP REQUESTS

FIG. 11F

GENERAL PURPOSE ARCHITECTURE FOR INTELLIGENT COMPUTER-AIDED TRAINING

The invention described herein was made by employees of the United States Government and may be manufactured and used by or for the Government of the United States of America for governmental purposes without the payment of any royalties hereon or therefor.

FIELD OF THE INVENTION

The present invention relates generally to the use of artificial intelligence for providing computer-aided training. Specifically, the present invention relates to a general purpose architecture adaptable for use in the training of personnel in the performance of complicated tasks to produce the desired results with a minimum expenditure of energy, time, and/or resources.

BACKGROUND OF THE INVENTION

Applications of Artificial Intelligence in Training and Tutoring

A number of academic and industrial researchers have used artificial intelligence in an effort to teach a variety of subjects including geometry, computer programming languages, medical diagnosis and electronic trouble shooting. The earliest published reports which suggested the application of artificial intelligence concepts to teaching tasks appeared in the early 1970's. The article entitled "AI in CAI: An artificial Intelligence Approach to CAI" by J. R. Carbonell in the IEEE Transactions on Machine Systems, Vol. 11, No. 4, p. 190 (1970) and the article entitled "Towards Intelligent Teaching Systems" by J. R. Hartley and D. H. Sleeman in the International Journal of Machine Studies, Vol. 5, p. 215, (1973) are of specific interest. Hartley and Sleeman proposed an architecture for an intelligent tutoring system. However, since such proposal, no agreement has been reached among researchers on a general architecture for intelligent tutoring systems.

Examples of intelligent tutoring systems are SOPHIE (Brown, Burton & de Kleer, 1972, "Pedagogical, Natural Language and Knowledge Engineering Techniques in SOPHIE I, II, and III"; D. Sleeman & J. S. Brown (Eds.), *Intelligent Tutoring Systems* (p. 227). London: Academic Press), PROUST (Johnson & Soloway, April 1985, PROUST, *Byte*, Vol. 10, No. 4, p. 179) and LISP Tutor (Anderson & Reiser, April 1985, "The LISP Tutor," *Byte*, Vol. 10, No. 4, p. 159). SOPHIE was one of the first artificial intelligence ("AI") systems that was developed. SOPHIE was developed in response to a U.S. Air Force interest in a computer-based training course in electronic trouble shooting. SOPHIE contains three major components: an electronics expert with a general knowledge of electronic circuits, together with detailed knowledge about a particular type of circuit; a coach which examines student inputs and decides if it is appropriate to stop the student and offer advice; and a trouble shooting expert that uses the electronics expert to determine which possible measurements are most useful in a particular context. Although three versions of SOPHIE were produced, SOPHIE was never viewed as a finished product. One of the major problems associated with the SOPHIE systems was the lack of a user model.

PROUST and the LISP Tutor are two well-known, intelligent teaching systems that have left the laboratory for general application. PROUST, and its related program MICRO-PROUST, is a "debugger" for finding nonsyntactical errors in Pascal programs written by student programers. The developers of PROUST claim that it is capable of finding all of the bugs in at least 70% of the "moderately complex" programming assignments that it examines. PROUST contains an expert Pascal programer that can write "good" programs for the assignments given to students. Bugs are found by matching the assertions of the expert program with that of the student; mismatches are identified as "bugs" in the student program. After finding a bug, PROUST provides an English language description of the bug to the student, enabling the student to correct his or her error. PROUST cannot handle student programs that depart radically from the programming "style" of the expert.

The LISP Tutor is used to teach the introductory LISP course offered at Carnegie-Mellon University. The LISP Tutor system is based on the ACT (Adaptive Control of Thought) theory and consists of four elements: a structured editor which serves as an interface to the system for students, an expert LISP programmer that provides an "ideal" solution to a programming problem, a bug catalog that contains errors made by novice programmers, and a tutoring component that provides both immediate feedback and guidance to the student. Evaluations of the LISP Tutor show that it can achieve results similar to those obtained by human tutors. One of the LISP Tutor's primary features is its enforcement of what its authors regard as a "good" programming style. The "good" programming style feature prevents creative authorship by the student.

The existing systems are "intelligent tutoring or teaching systems." The teaching/tutoring task is distinguished from the training task. The training environment differs in many ways from an academic teaching environment. The differences are important in the design of an architecture for an intelligent training system. For example, assigned tasks are often mission-critical, i.e., the responsibility for lives and property depends on how well a person is trained to perform a task. Typically, people who are being trained already have significant academic and practical experience which is utilized in the task they are being trained to do. Also, trainees make use of a wide variety of training techniques. Different training techniques can range from the study of comprehensive training manuals, to simulations, to actual on-the-job training under the supervision of more experienced, trained personnel. Few tasks which require training must be accomplished by one method or style as exists in typical tutoring. Training a person to perform a task may require that considerable freedom be given the trainee in the exact manner in which the task may be accomplished.

People being trained for complex, mission-critical tasks are usually already highly motivated. Training for such complex tasks imposes on the trainer the responsibility for the accuracy of the training content and the ability of the trainer to correctly evaluate trainee actions. Typical tutoring systems do not provide such flexibility. A training system is intended to aid the trainee in developing skills for which he already has the basic or "theoretical" knowledge. A training system is not intended to impart basic knowledge such as mathematics or physics. Simply stated, a true training system is designed to help a trainee put into practice that which he already intellectually understands. Most importantly, a trainee must be allowed to perform an assigned task by any valid means. To achieve meaningful training, the flexibility to carry out any assigned task by any valid means is essential. Trainees must be able to retain and even hone an independence of thought and develop confidence in their ability to respond to problems, including problems which the trainee has never encountered and which the trainer may have never anticipated.

All phases of industry and government must maintain a large effort in training personnel. New personnel must be trained to perform the task which they are hired to perform, continuing personnel must be trained to upgrade or update their ability to perform assigned tasks and continuing personnel must be trained to perform new tasks. Often a great number of training methodologies are employed, singly or in concert. These methods include training manuals, formal classes, procedural computer programs, simulations, and on-the-job training. The latter method is particularly effective in complex tasks where a great deal of independence is granted to the task performer. Of course, on-the-job training is typically the most expensive and may be the most impractical training method, especially where there are many trainees and few experienced personnel to conduct such training.

Programming Languages for Artificial Intelligence Applications

All programming languages can be thought of as being divided into two primary functioning units: data and process. Data involves whatever means the language provides for representing objects which the programmer uses to manipulate. Typical data items might be variables used in formulas, matrices of numbers used for representing dimensionality, or lists of data groups such as patient records or student grades. Most conventional programming languages have evolved rather elaborate schemes for representing data, for example, integer and floating point representations. Process involves the programmer's directions for manipulation of the data structures. By analogy, if a computer program were like a recipe, data would be the ingredients and process would be the step-by-step cooking instructions.

Historically, computers have been typically utilized exclusively for mathematical calculation. However, more recently computers have begun to do reasoning, sometimes called "symbolic reasoning" in the computer science community. The standard upon which artificial intelligence systems are based is that intelligent systems reason about objects in the world, and do so in a rational way. Thus, the data in the artificial intelligence community was the representation of objects in the real world which were sometimes labeled as facts. Process became an inferencing scheme which could be used to manipulate the facts in a formal way. Artificial intelligence developed somewhat like first order logic which has a very precise means for defining axioms (facts or data) and a very orderly way of performing deduction and induction (inference or process).

The resulting languages which are used to implement most expert systems are termed "rule-based" languages. A programmer writes instructions for inferencing in the form called rules. Each rule has a "left-hand-side" used to match facts in the current database of facts and a "right-hand-side" used to perform actions on the facts in the database. Each rule is basically of the form "if you see such-and-such among the facts currently known, then do so-and-so." Sometimes rules are generally called "if-then" rules because of this analogy.

The application of any single rule is very simple. The underlying language checks to see if the description of the facts cited on the left-hand-side of the rule match any of the facts currently in the system. If so, then the actions described on the right-hand-side of the rule are carried out. This process continues until no more rules can be matched to the facts in the database. When no rules can be matched, the program ends.

Generally, facts are described as representations of data objects about which the system is going to reason. Facts are typically described in terms of a "relation" which is meant to describe a relationship between some object and one or more of its attributes. In general, facts are an assertion of a more general relation form. Rules can be used to retract or delete facts from the database. Further, rules can be used to assert new facts to the database. Thus, whenever a rule is executed or "fired," it may change the contents of the facts in the database. Any rule which has all of the patterns of its left-hand-side matched is placed on an agenda of rules which can potentially be fired. However, since the execution of any single rule may change the database, only one of the rules on the agenda is fired at once. When the particular rule is fired, the database of facts must be updated and the matching process is restarted. The cycle is repeated until the process of matching all of the rules does not produce any rule which has a fully satisfied left-hand-side.

Features of the Invention

Of primary concern in the present invention is to provide a general purpose architecture suitable for intelligent computer-aided training which can be readily adapted for use in numerous training disciplines.

It is, therefore, a feature of the present invention to provide an intelligent computer-aided training system which utilizes a general purpose architecture for adaptation to training in different fields.

A feature of the present invention is to provide an intelligent computer-aided training system which utilizes a plurality of expert systems which communicate via a common "blackboard" arrangement.

Another feature of the present invention is to provide an intelligent computer-aided training system having a general purpose architecture which provides a user interface which is sufficiently similar to the actual task performed so that training skills are easily transferred from the training environment to the task environment.

Another feature of the present invention is to provide an intelligent computer-aided training system having a general architecture which provides a domain expert system which is capable of performing the task to be trained by using rules describing the correct methods of performing the task and rules identifying typical errors.

Another feature of the present invention is to provide an intelligent computer-aided training system having a general architecture adaptable to teach different tasks having an expert training scenario generator for designing increasingly complex training exercises based upon the current skill level of the trainee.

Another feature of the present invention is to provide an intelligent computer-aided training system having a general architecture which has an expert training session manager for comparing the assertions made by the domain expert and by the trainee for identifying both correct and incorrect trainee assertions and for determining how to respond to incorrect trainee actions.

Another feature of the present invention is to provide an intelligent computer-aided training system having a general architecture including a trainee model which contains a history of the individual trainee's interactions with the system together with summary evaluative data which can be accessed by both the trainee and an evaluator.

Yet another feature of the present invention is to provide an intelligent computer-aided training system having a general architecture whereby trainees can carry out an assigned task by any valid means.

Yet another feature of the present invention is to provide an intelligent computer-aided training system having a general modular architecture for use in a wide variety of training tasks and environments which require modification of only one, or possibly two, of the components when changing tasks.

Still another feature of the present invention is to provide an intelligent computer-aided training system having a general modular architecture whereby each altered component is designed to make the modifications necessary to produce an intelligent computer-aided training system for a specific task rapid and capable of being accomplished by persons skilled in the art of computer programming.

Another feature of the present invention is to provide an intelligent computer-aided training system having a general modular architecture for use by trainees already possessing the necessary educational background for the task for which the training is initiated.

Yet another feature of the present invention is to provide an intelligent computer-aided training system having a general modular architecture whereby trainees are permitted great latitude in how they achieve a particular task such that trainees are permitted to follow any valid path to achieve the task, and further optional actions need not be taken, but the omission of optional actions is noted in the system and can be used in the generation of future training scenarios.

Still another feature of the present invention is to provide an intelligent computer-aided training system having a general modular architecture whereby the modules communicate by means of a common fact base which fact base is termed a blackboard.

Another feature of the present invention is to provide an intelligent computer-aided training system having a general modular architecture for segregating portions of the system that can be applied to other training environments and tasks.

Yet another feature of the present invention is to provide an intelligent computer-aided training system having a general modular architecture whereby one module is a user interface designed for a specific environment and which can be used for training in other tasks that are performed in the same environment.

Still another feature of the present invention is to provide an intelligent computer-aided training system having a general modular architecture whereby all task-specific items are confined to a single module for incorporating domain knowledge of the specific task as well as explanations, error messages and database information from which new training scenarios can be derived.

Yet another feature of the present invention is to provide an intelligent computer-aided training system having a general modular architecture whereby new training scenarios are designed uniquely for each trainee every time the specific trainee interacts with the system.

Yet another feature of the present invention is to utilize time constraints and distractions when the trainee has demonstrated a specific level of proficiency.

Yet another feature of the present invention is to provide an intelligent computer-aided training system having a general modular architecture whereby training scenarios incorporate specific problems or requested assistance associated with interactions the trainee had in previous training such that new scenarios are created which require that the trainee demonstrate mastery of the task.

Yet still another feature of the present invention is to provide a control structure used in intelligent computer-aided systems which utilizes rule-based programming for inferencing by matching facts in a current database and performing actions on the facts whereby multiple sets of rules act in concert.

Another feature of the present invention is to provide a message passing protocol whereby multiple sets of rules can act in concert.

Another feature of the present invention is to utilize a message protocol whereby the message format comprises information regarding which rule group has sent the message, which rule group should use the message, the context or step of the process to which the given message applies, and the contents of the message.

Yet another feature of the present invention is to provide control rules for use with intelligent computer-aided systems for implementing multiple sets of rules in concert.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, an intelligent computer-aided training system having a general modular architecture is provided for use in a wide variety of training tasks and environments comprising a user interface which permits the trainee to access the same information available to him in the task environment and serves as a means for the trainee to assert actions to the system; a domain expert which is sufficiently intelligent to use the same information available to the trainee and carry out the task assigned to the trainee; a training session manager for examining the assertions made by the domain expert and by the trainee for evaluating such trainee assertions and providing guidance to the trainee which are appropriate to his acquired skill level; a trainee model which contains a history of the trainee interactions with the system together with summary evaluative data; an intelligent training scenario generator for designing increasingly complex training exercises based on the current skill level contained in the trainee model and on any weaknesses or deficiencies that the trainee has exhibited in previous interactions; and a blackboard means for providing a fact base for communication between the other components of the system.

Preferably, the domain expert contains a list of "mal-rules" which typifies errors that are usually made by novice trainees. Also preferably, the training session manager comprises an "intelligent" error detection means and an "intelligent" error handling means.

The present invention utilizes a rule-based language having a control structure whereby a specific message passing protocol is utilized with respect to tasks which are procedural or step-by-step in structure. The rules can be activated by the trainee in any order to reach "the solution" by any valid or "correct" path.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

FIGS. 2A-2F illustrate typical screens as viewed by a trainee utilizing the preferred embodiment of the intelligent computer-aided training system of the present invention;

FIG. 5A and FIG. 5B illustrate how trainee actions (correct and incorrect) are classified and stored in the trainee model;

The above general description and the following detailed description are merely illustrative of the generic invention, and additional modes, advantages and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

Figure 1A:
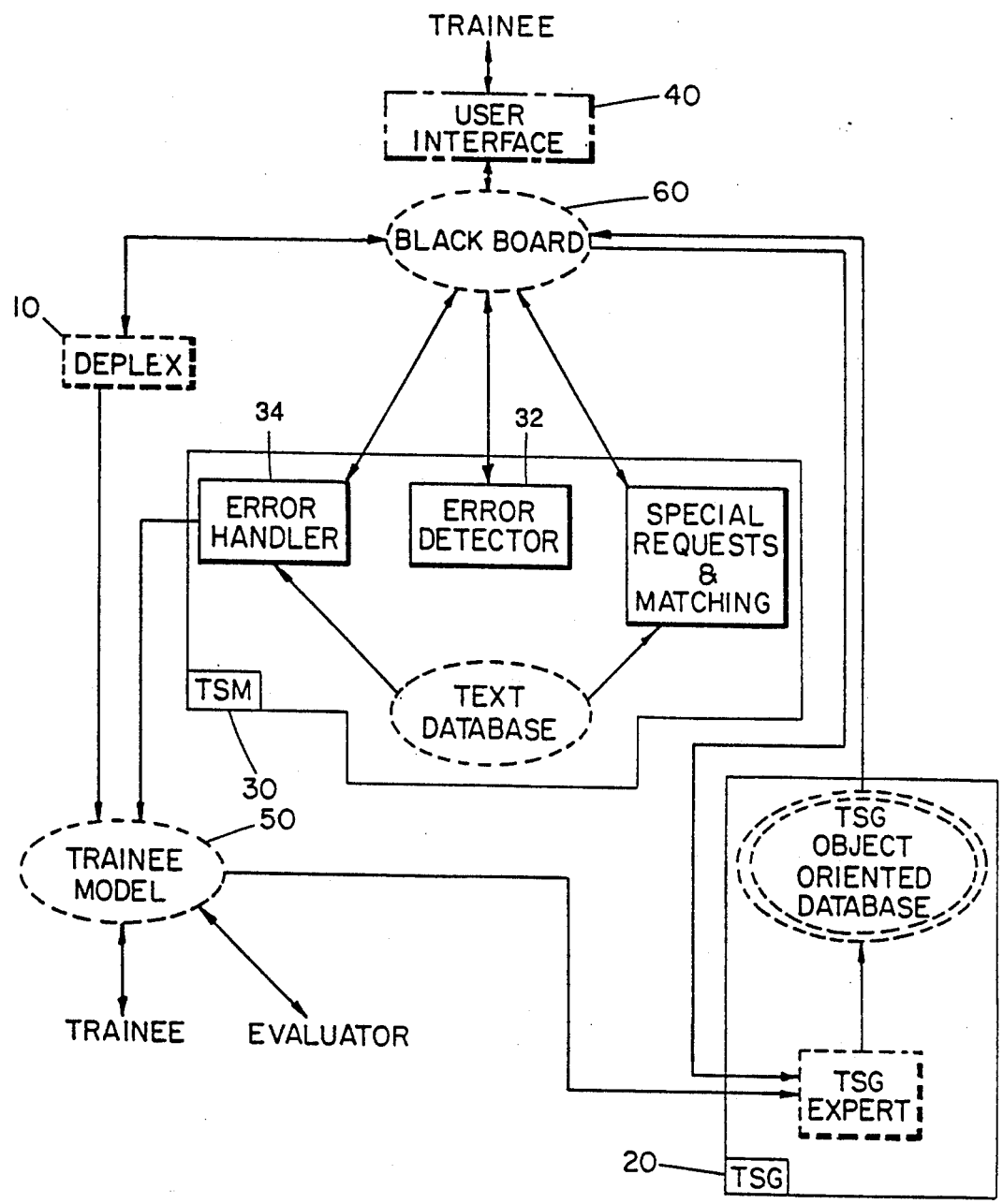
FIG. 1A is a schematic diagram of the general architecture of a preferred embodiment of the intelligent computer-aided training system of the present invention.
Figure 1B:
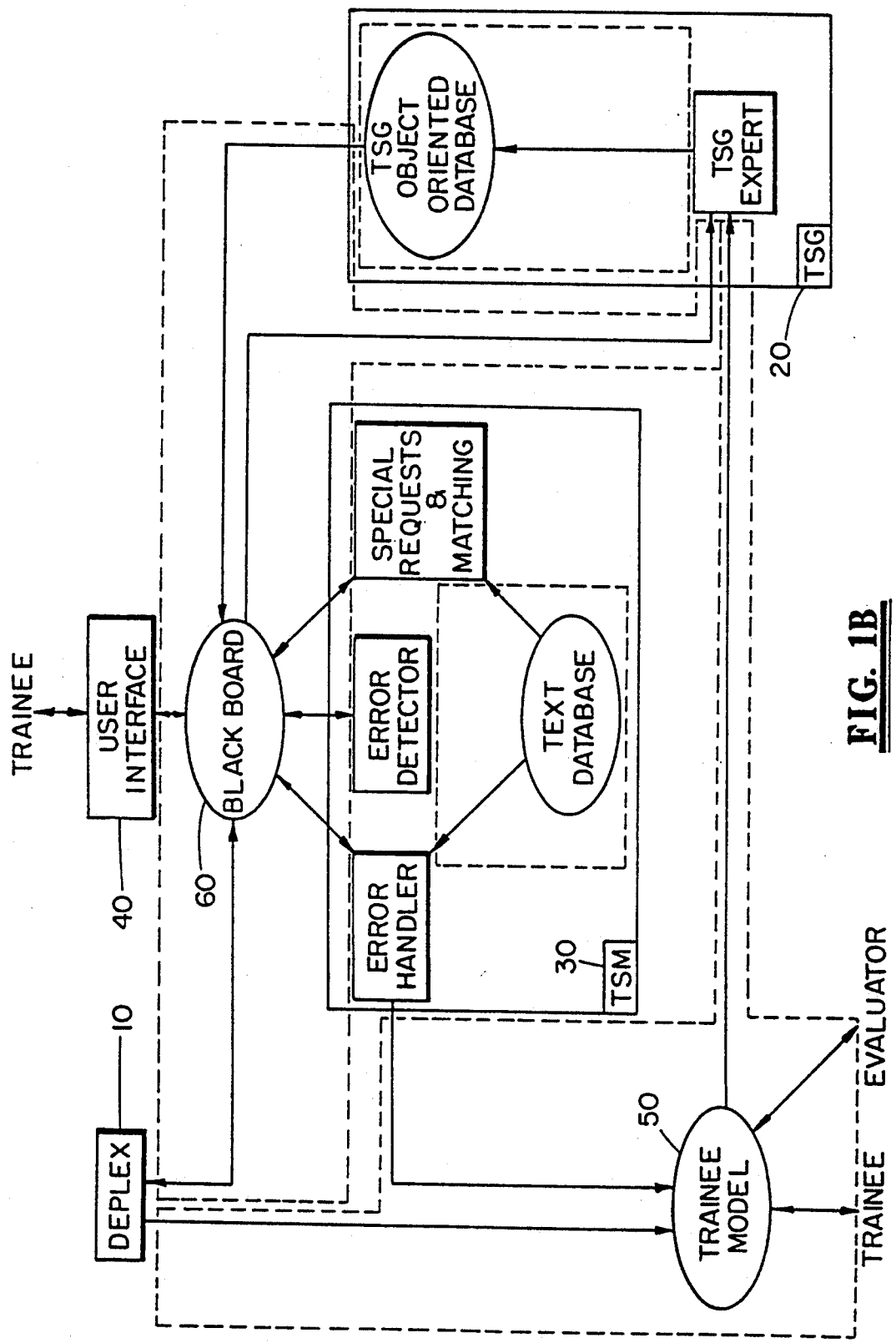
FIG. 1B is a schematic diagram of the general architecture as illustrated in FIG. 1A further illustrating the generic aspects of the data transfer associated with a preferred embodiment of the intelligent computer-aided training system of the present invention.
Figure 2C:
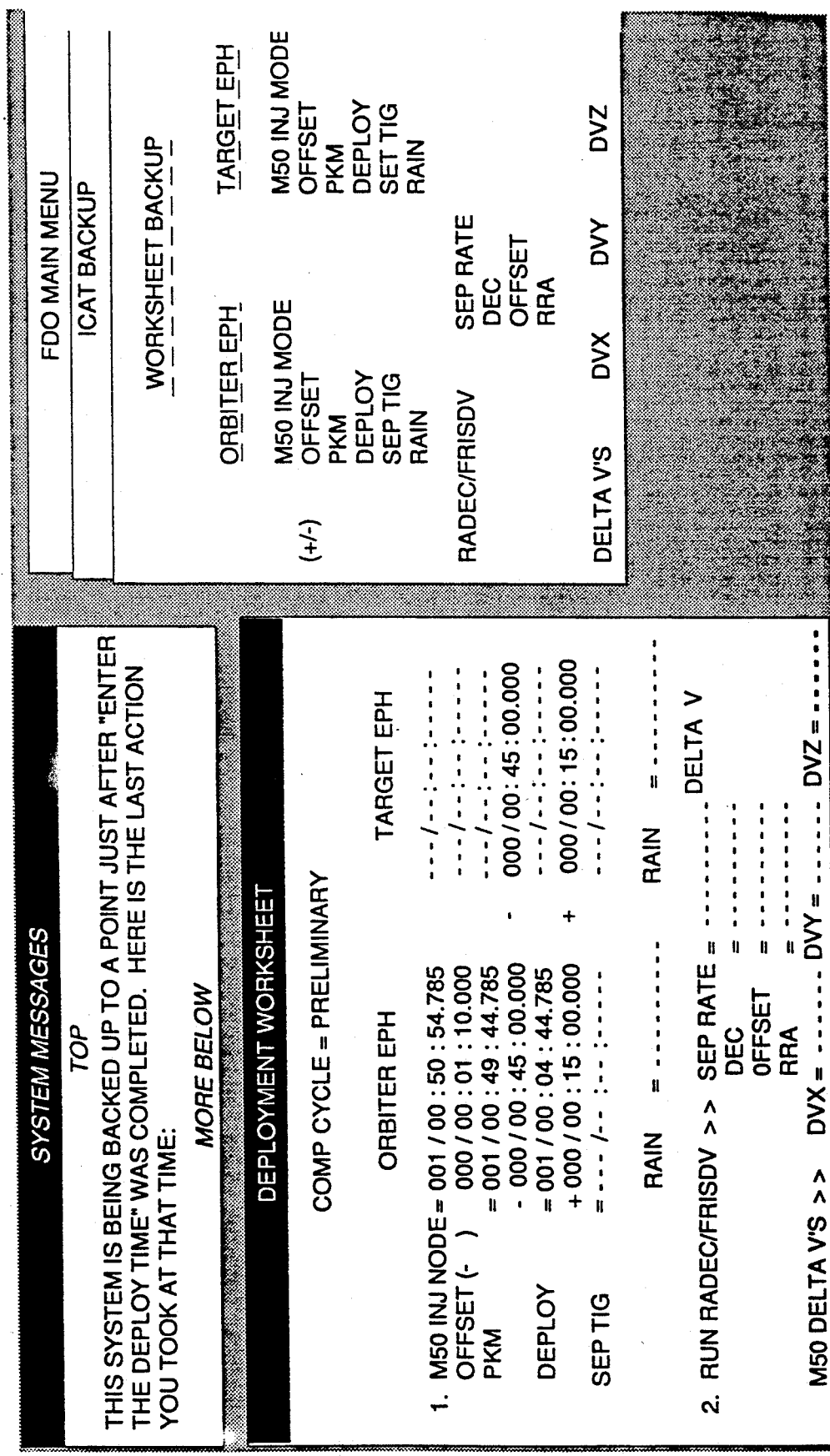
Figure 2D:
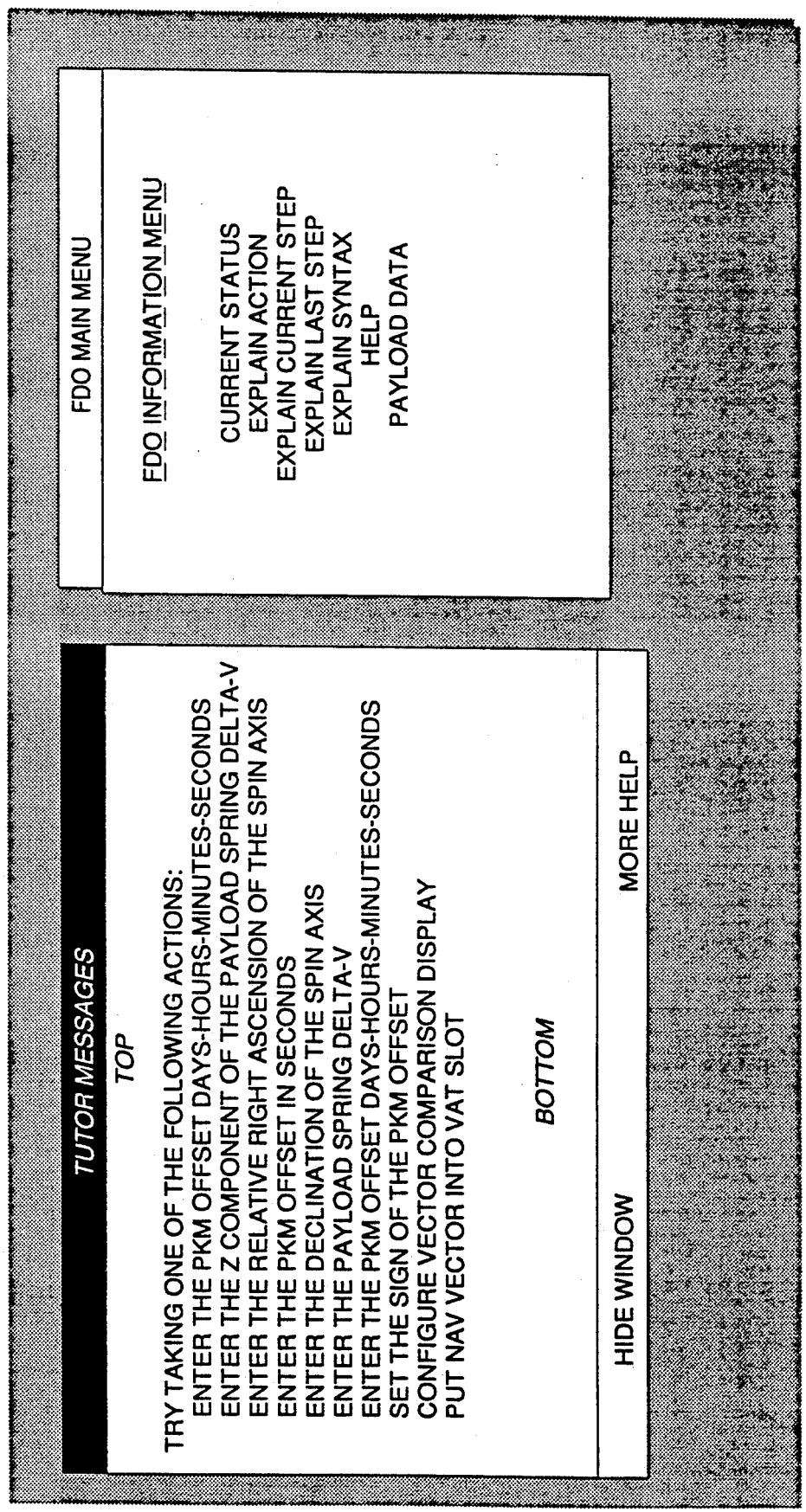
Figure 2E:
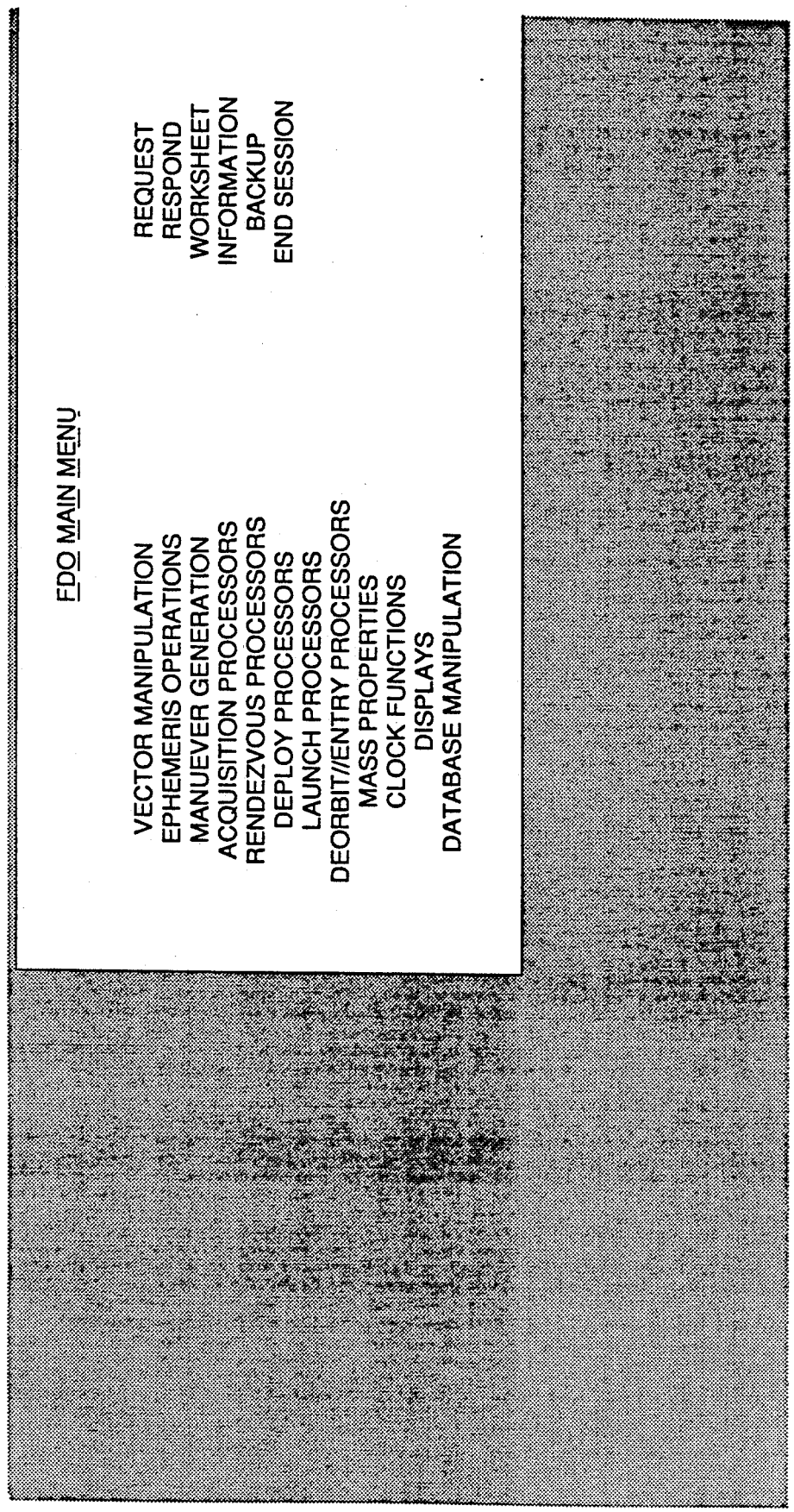
Figure 2F:
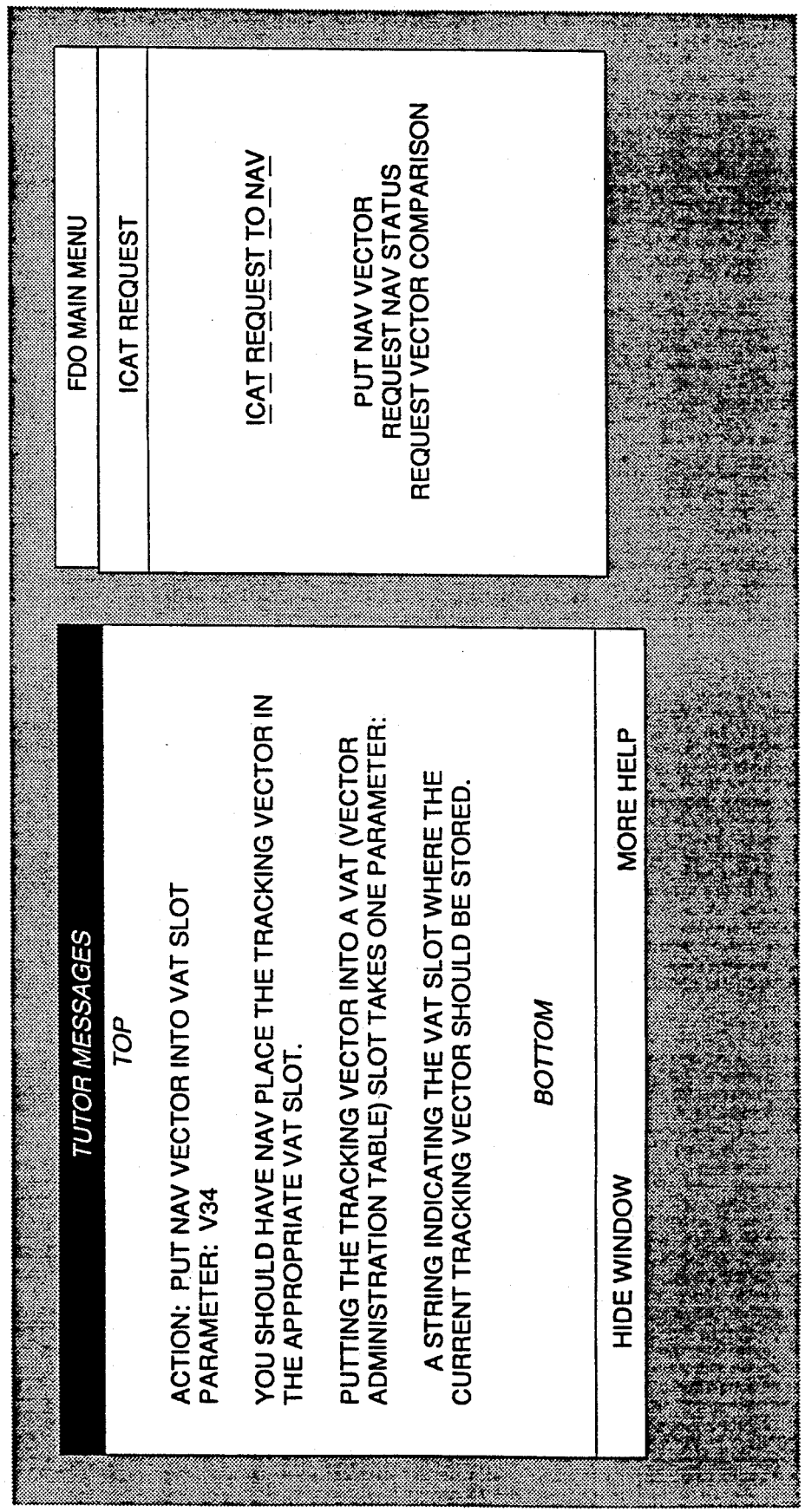

FIG. 1A and FIG. 1B are schematic representations illustrating the general modular architecture for intelligent computer-aided training. The primary components are the domain expert or Deplex 10, the training scenario generator 20, the training session manager 30, the user interface 40 and the trainee model 50. Generally, the training session manager 30 comprises two expert systems: the error detector expert 32 and the error handler expert 34. The user interacts with the intelligent computer-aided training system via the user interface 40. Alternately, the user can access information concerning his level of skill and performance during a given training session via the report generation feature of the trainee model 50. Also, an evaluator can access the trainee model 50 to acquire information about a specific trainee's performance.

The general modular architecture consists of the five modular components communicating by means of a common "fact base," termed a "blackboard." The blackboard 60 acts as a vehicle through which each of the other components communicate.

Generally, the components of the intelligent computer-aided training system are generic, environment specific or task specific. In an effort to readily build new systems, it is required that as many components as possible be generic. However, the task environment must be as compatible as possible with the environment in which the trainee will ultimately perform. Obviously, it is extremely important that the actual task environment be duplicated as accurately as possible. In the present preferred embodiment, the generic components are the training scenario generator 20 (except the contents of its object-oriented database), the training session manager 30 and the trainee model 50. The environment specific module (i.e., the interface between the trainee and the task to be performed) is the user interface 40. The task specific module is the domain expert or Deplex 10. Since there may be many tasks which share a common environment, the development of a user interface is important. The user interface 40 serves to make the production of training systems for that particular environment more efficient. Obviously, it is extremely important that a trainee be trained in an environment which represents, as clearly as possible, that in which he will ultimately have to perform the task.

Ordinarily, the general architecture for the present invention is comprised of the four expert systems which cooperate through, and communicate by, the blackboard 60. The four expert systems which interact through the blackboard 60 are the domain expert or Deplex 10, the training scenario generator 20, the error detector expert 32 and the error handler expert 34. The modular expert system approach was used to permit segregation of domain-independent knowledge from domain-dependant knowledge so that the system architecture can be easily adapted to different training tasks. Unlike most intelligent training systems, the present invention does not required the trainee to follow a single correct path to the solution of a problem. Rather, a trainee is permitted to select any correct path, as determined by the training context. The method used to accomplish this fidelity and flexibility prevents a combinational explosion of solution paths.

Error detection via the error detection expert 32 is extremely important. The error detector expert 32 compares the trainee's actions with the knowledge in the domain expert 10. In the case of complex actions, the error detection is made at the "highest" level to avoid confusing the trainee by detecting all errors which propagated from that error which is deemed most significant.

In the same general context, error handling is also important with respect to the present invention. Error handling may be accomplished through the matching of trainee actions with "mal-rules" in the domain expert or Deplex 10. The mal-rules contain errors which are commonly made by novice trainees. In addition, the error handler expert 34 in the training session manager 30 decides what type of feedback or guidance to give the trainee. The error handler expert 34 uses the trainee model 50 to determine the type of feedback and guidance to give to the trainee. Explanations or hints may be detailed for novices and quite terse for more experienced trainees. In some cases, the training session manager 30 may decide not to call attention to the error if there is a reasonable probability that the trainee will catch his or her own mistake.

Generally, the training scenario generator 20 examines the trainee model 50 and creates a unique scenario for each trainee whenever a new session begins. This new scenario is built from an object-oriented database containing a range of typical parameters describing the training context as well as problems of graded difficulty. Scenarios evolve to greater difficulty as the trainee demonstrates the acquisition of greater skills in solving the training problem.

At the conclusion of each session, the trainee is provided with a formatted trace of the session which highlights the correct and the incorrect actions, the time taken to complete the session and the type of assistance provided by the intelligent computer-aided training system. In addition, the trainee's supervisor may view a global history of each trainee's interaction with the system and even generate graphs of trainee performance measured against a number of variables.

The task which was selected to implement the general architecture for intelligent computer-aided training systems was the deployment of a satellite from a space shuttle. The preferred embodiment of the intelligent computer-aided training system, as illustrated in FIG. 1, was developed for use by NASA/Johnson Space Center flight controllers in learning to perform satellite deployment from the space shuttle. The general purpose architecture used as previously described includes four cooperating expert systems (the domain expert or Deplex 10, the training scenario generator 20, the error detector expert 32 and the error handler expert 34), communication via the blackboard 60, support for multiple solution paths, error handling appropriate to the trainee's demonstrated level of skill, and automatic generation of unique training scenarios based on training objectives and a trainee's history of interaction with the system.

By way of example, a brief discussion is presented on the implementation of the general purpose architecture for the specific problem of satellite deployment from a space shuttle. Flight controllers at NASA/Johnson Space Center (JSC) are responsible for the ground control of all space shuttle operations. Those operations which involve alterations on the characteristics of the space shuttles's orbit are under the direction of a Flight Dynamics Officer (FDO) who sits at a console in the "front room" of the Mission Control Center (MCC). Most FDO's have backgrounds in engineering, physics, and/or mathematics. They acquire the skills needed to perform their job through the study of flight rules, training manuals, and on-the-job training (OJT) in integrated simulations. Two to four years is normally required for a trainee FDO to be certified for many of the tasks for which he or she is responsible during space shuttle missions. On-the-job training is highly labor intensive and presupposes the availability of experienced personnel with both the time and the ability to train novice FDO's. As the number of experienced FDO's has been reduced through retirement, transfer, and promotion and as the preparation for and actual control of missions occupies most of the Mission Control Center's available schedule, on-the-job training has become increasingly difficult to deliver to novice FDO's. As a supplement to the existing modes of training, the general purpose architecture for intelligent computer-aided training has been implemented to aid in the training of FDO's. The system trains inexperienced flight controllers in the deployment of a payload-assist module (PAM) satellite from the space shuttle. This procedural task is complex and requires many of the skills used by the experienced FDO in performing many other on-orbit operations. The presently preferred embodiment of the present invention comprising the general purpose architecture has been created to assist in the training of FDO's in the deployment of a satellite from the space shuttle.

The payload-assist module deploys/intelligent computer-aided training (PD/ICAT) system is an autonomous intelligent training system which integrates expert system technology with training methodology. The present preferred embodiment of the system was designed for novice FDO's who have completed a study of satellite deployment procedures as described in available training documents. The training system is designed to aid these trainees in acquiring the experience necessary to carry out a deployment in an integrated simulation.

The preferred embodiment of the present system is used to permit extensive practice with both nominal deploy exercises and other exercises containing typical problems. After successfully completing training exercises that contain the most difficult problems together with realistic time constraints and distractions (as would be expected in the real world), the trainee should be able to successfully complete an integrated simulation of a satellite deployment without the aid of an experienced FDO. The philosophy of the system is to emulate, as closely as possible, the behavior of an experienced FDO devoting his or her full time and attention to the training of a novice FDO. Typically, an experienced FDO will propose challenging training scenarios, monitor and evaluate the actions of the trainee, provide meaningful comments in response to trainee errors, respond to trainee requests for information and hints (if appropriate), and remember the strengths and weaknesses displayed by a trainee so that appropriate future exercises can be designed.

FIGS. 1A and 1B, which schematically describe the general purpose architecture of the present invention for the PD/ICAT system, were developed as the preferred embodiment. The blackboard 60 serves as a common "fact base" and communicates information to and from all five system components. With the exception of the trainee model 50, each component makes assertions to the blackboard 60, and the rule-based components look to the blackboard 60 for facts which can "fire" their rules.

The user interface 40 allows trainee FDO's to access the same information available to them in the Mission Control Center. Also, the user interface 40 serves as a means for trainees to take actions and communicate with the training session manager 30.

The user interface 40 was designed primarily to reproduce the task environment with a high degree of fidelity. To avoid negative training, it is essential that the functionality and the actual appearance of the training environment duplicate that in which the task is performed. Generally, there are several levels of interaction for a FDO. First, the FDO reviews the screen information at his particular station. Second, the FDO has voice interaction with other people in the Mission Control Center. Lastly, the FDO can seek advice from experienced FDO's.

FIGS. 2A–2G contains several views of a typical display screen seen by a trainee FDO on a Symbolics ® 3600 Series LISP computer. With respect to voice loop interactions, the upper right-hand corner of the display (FIGS. 2C–2F) contains menus that allow the FDO trainee to communicate with other simulated flight controllers, to obtain needed displays of data, to obtain information about the current or previous step in the satellite deployment process, to request help from the training system, and to return to a previous step in the process. The upper right-hand corner menu may lead the trainee through as many as three levels, depending on the nature of the action taken. Some actions are completely accomplished through menu interaction, while other require the input of one or more parameters using the computer's keyboard.

All actions taken by the trainee through these menus, and the parameters that they may require, become assertions to or facts in the blackboard 60. All requests directed to the trainee and all messages sent to the trainee in response to his or her requests or actions appear in a window in the upper left corner of the screen (FIGS. 2-C to 2-E and 2-G). These two portions of the screen serve to functionally represent the "voice loop interaction" that characterizes the current FDO task environment in the "front room" of the Mission Control Center.

With respect to console messages, any displays requested by the trainee FDO appear in the lower portion of the screen. The displays replicate those seen by a FDO on a typical console in the Mission Control Center. Data is supplied to these displays from a dedicated ephemeris-generating program so that what is seen by the trainee FDO is consistent and reasonable and negative training does not occur.

With respect to help from the system, a pop-up window (called the tutor message window) appears approximately in the center of the screen to provide error messages, context information, and help.

The domain expert/Deplex 10 is a traditional expert system in that it contains production or if-then rules which access data describing the task environment and is capable of executing the task and arriving at the correct solution or solutions, or performing the correct actions. For example in the present case, the domain expert/Deplex 10 has the "knowledge" necessary to deploy a payload-assist module satellite from the space shuttle. In addition to "knowing" the right way to carry out the task (the deployment of the payload-assist satellite), the domain expert/Deplex 10 contains knowledge of the typical errors that are made by novices. Such typical errors are termed "mal-rules." Thus, a feature of the general architecture of the present system is to provide mal-rules.

The present system can detect any erroneous action made by a trainee, and in addition thereto, through the use of the mal-rules, diagnose the nature of the error and provide an error message to the trainee specifically designed to inform the trainee about the exact error made. Also, the mal-rule aids in correcting the misconception or lack of knowledge that led to the commission of any particular error. Thus, the mal-rules aid in diagnosing the nature of an error. Further through interaction with the trainee model 50, the domain expert/Deplex 10 can readily alter the nature of a message to be adapted to the demonstrated skill of the trainee. The domain expert/Deplex 10 may have numerous messages and the error handler expert 34 decides which error type to pick for a specific trainee.

A unique feature of the present invention is its continual awareness of the environment and the context of the exercise. The environment can be generally described as the external constraints dictated by the training exercise. This feature provides the basis for "user-directed" behavior on the part of the domain expert/Deplex 10. The domain expert/Deplex 10 does not generate a complete and correct set of actions to accomplish a task. Rather, the domain expert/Deplex 10 only generates those actions which are germane to the current context. Thus, the domain expert/Deplex 10 readily adapts to any correct path that the trainee might choose to follow. The strategy of allowing the domain expert/Deplex 10 to follow any correct path elected by the trainee was adopted because the human experts that perform the task (deployment of the satellite from the space shuttle) recognize that many steps in the process may be accomplished by two or more equally valid sequences of actions. To grant freedom of choice to the trainee and to encourage independence, the ability to adapt to alternate correct paths was deemed essential.

Figure 3:
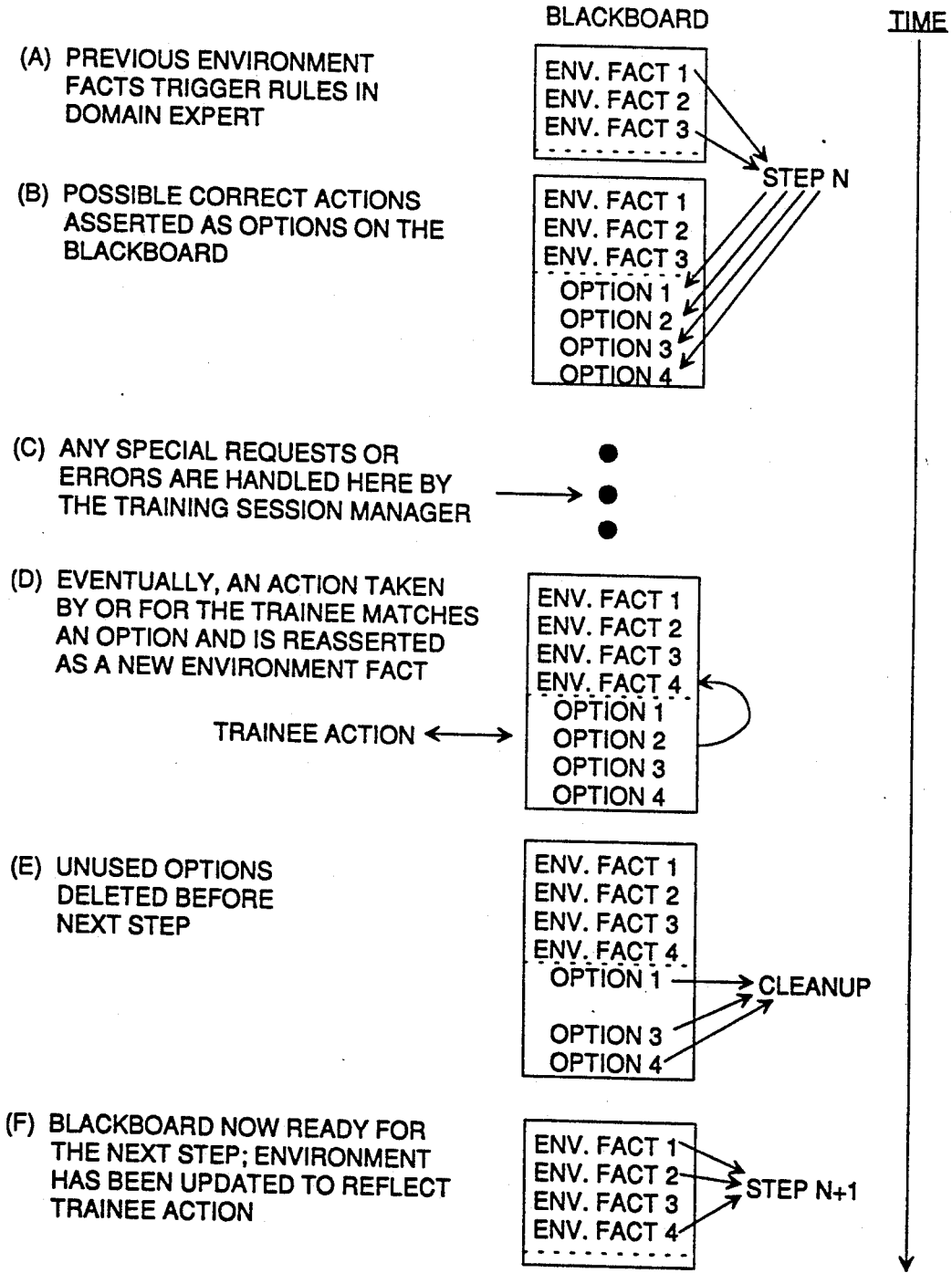
FIG. 3 is a schematic diagram illustrating the operation of the domain expert associated with the preferred embodiment of the intelligent computer-aided training system of the present invention.

FIG. 3 illustrates schematically how the domain expert 10 operates. The rectangles illustrate the assertions (or facts) presented to the blackboard 60. In step (A), previous events which have been asserted to the blackboard 60 trigger rules in the domain expert 10. Thus, as illustrated in FIG. 3, EVENT 1 and EVENT 3 trigger STEP N. STEP N causes the domain expert 10 to assert options 1 through 4 to the blackboard 60. In step (D), the trainee action matches option 2 which was asserted by the domain expert 10 to the blackboard 60. The matched option 2 is reasserted in the blackboard as new EVENT 4. So that the blackboard 60 does not accumulate a fact base of unmanageable size, the unused options are deleted before the next step. The events currently asserted to the blackboard are accessed by the production rules to trigger STEP 5. The sequence is repeated.

An important feature of the general architecture of the present invention is the ease with which it can be adapted to training individuals to perform different tasks in the same environment or in different environments. In the present invention, those elements of the training system unique to the task for which the system is designed are confined to the domain expert 10 and the object-oriented database of the TSG 20. These task specific elements include the rules for performing the task, the mal-rules, the text from which error and help messages are generated, and the elements necessary to define a training scenario.

The training session manager 30 is dedicated to error detection and error handling. The training session manager 30 comprises an error detector expert system 32 and an error handler expert system 34. Error detection is made in a hierarchical manner by defining trainee actions as action/parameter pairs. Even though four or more levels of such pairs may comprise a single trainee action, the error detection halts at the highest level. High level detection is accomplished so that only one error is actually diagnosed and remedied for each trainee action. Thus, the error detection provides an indication of the most serious, or the highest level, error made by the trainee in the completion of the action. The rules associated with the error detector expert system 32 compare the assertions of the domain expert 10 with those of the trainee to detect errors. Subsequently, the domain expert 10 provides the text that allows the error handler expert 34 in the training session manager 30 to write appropriate error messages to the trainee through the user interface 40.

In addition (referring again to FIG. 1), the training session manager 30 is sensitive to the skill level of the trainee as represented by the trainee model 50. As a result, the detail and tone of error messages are chosen to match the current trainee. For example, an error made by a trainee who is using the system for the first time may require a verbose explanation to make certain that the new trainee will have all of the knowledge and concepts needed to proceed with the training session. On the other hand, a trainee who has considerable experience on the system may have momentarily forgotten a particular procedure or may have lost his or her place. In the latter case, a terse error message would be adequate to allow the trainee to resume the exercise. The error handler expert system 34 in the training session manager 30 and the domain expert 10 mal-rules encode all trainee actions, both correct and incorrect, and pass them to the trainee model 50.

Figure 4:
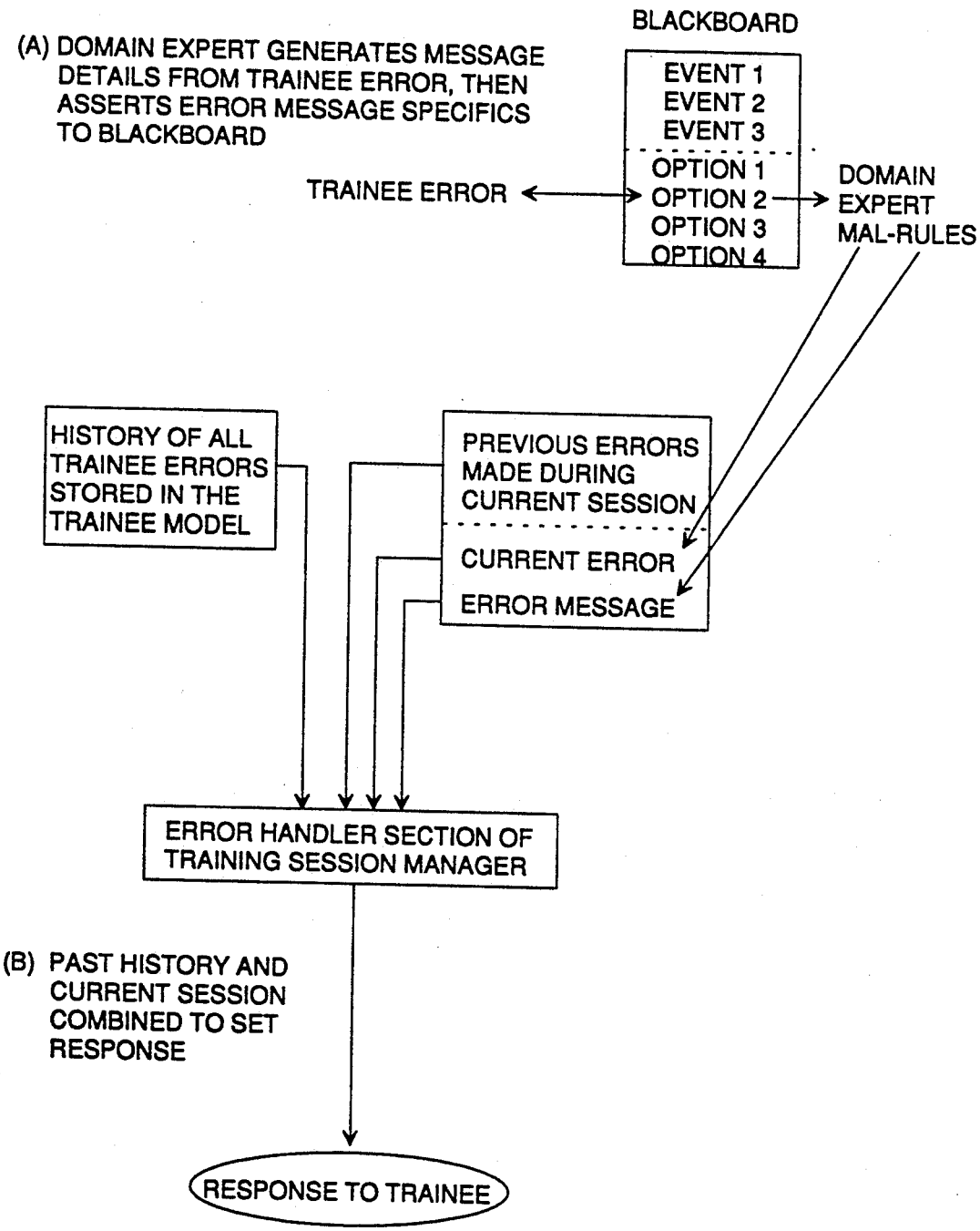
FIG. 4 is a general representation illustrating the manner in which the training session manager examines trainee actions for errors.

FIG. 4 illustrates schematically how the training session manager 30 and trainee model 50 are used in concert to handle errors made by the trainee. For example, the blackboard 60 has asserted thereto EVENTS 1, 2 and 3. The options 1, 2, 3 and 4 have been asserted to the blackboard 60 and the trainee incorrectly elects option 2 which is not acceptable based upon EVENTS 1, 2 and 3 being asserted to the blackboard 60. Option 2 is referred to the domain expert/deplex 10 which asserts to the blackboard 60 the current error and an error message. The previous errors made during the current session are consulted as well as the history of all trainee errors stored in the trainee model 50. Based upon the past history of all trainee errors and the previous errors made during the current session, a response is submitted to the trainee via the user interface 40.

Assertions are facts in the fact base or "on the blackboard." All the associated expert systems can "see" the facts all the time. The mal-rules in the domain expert/deplex 10 operate in parallel to the rules in the error detector expert 32. The mal-rules are domain-specific elements of error detection. Assertions made by the domain expert 10 mal-rules are used by the error handler expert 34, just as are assertions made by the error detector expert 32.

The trainee model 50 acts to record trainee actions, update trainee summaries, provide reports and provide information to the training scenario generator 20 to produce new scenarios. The trainee model 50 of the present invention accepts from the training session manager 30 assertions made as a result of trainee actions. These actions include any attempt by the trainee to (1) perform a domain-specific task, (2) request help regarding how to perform the task or what syntax to use in performing a specific action, and (3) back up to a previous step in the procedure being trained. Thus, at its most fundamental level, the trainee model 50 contains (for the current training session) a complete record of the correct and incorrect actions taken by the trainee. At the conclusion of each training session, the model updates a training summary containing information about the trainee's progress, such as a skill-level designator, the number of sessions completed, the number of errors made by error type and session, and the time taken to complete the session. After completing a session, the trainee can obtain a session report containing a comprehensive list of correct and incorrect actions together with an evaluative commentary. A supervisor can access the same commentary or obtain summary data, at a higher level, on a trainee's progress. The trainee model 50 provides information to the training scenario generator 20 to produce new training exercises.

Figure 4A:
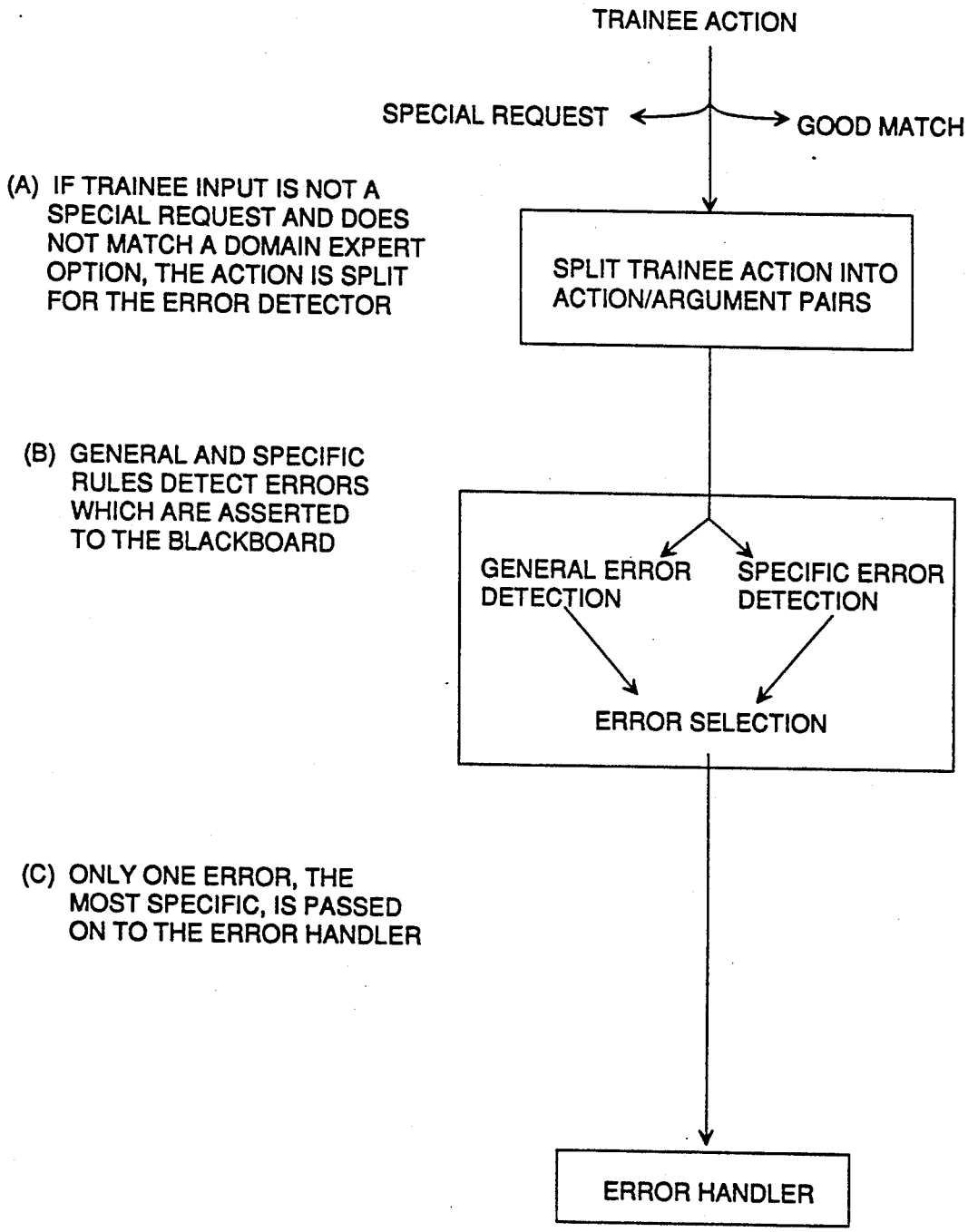
FIG. 4A is an illustration of the error control for actions taken by a trainee during a basic trainee session for the preferred embodiment of the intelligent computer-aided training system of the present invention.

FIG. 4A illustrates a general representation of the function of the training session manager 30 for a particular trainee action which is erroneous. The trainee model 50 contains local history and global history. Local history comprises the type of action, the type of help, the optional action, the type of error and the error explanation. The global history comprises the training session number, the time, the number of helps requested, the number of errors and the level of skill. Both the local and global histories are stored in the trainee model 50 in the template forms shown in FIGS. 5A and 5B. FIGS. 5A and 5B depict one embodiment of these templates for the associated descriptions and definitions used in the presently preferred embodiment of the invention for the Payload-Assist Module Deploy/Intelligent Computer-Aided Training System (PD/ICAT). The step template list (FIG. 5A) is context-oriented. Each trainee action and its local history are stored in a step template. Each trainee action, request for help, and trainee error is also associated with a back up level that is initialized at the beginning of a training session. The back up level is incremented each time the trainee backs up to a previous context (or step). All subsequent trainee actions, requests for help, and errors are identified with this new back up level. All trainee actions, optional actions, requests for help, and errors in the same context at all back up levels are stored in the same step template. The step sequence (FIG. 5A) in the trainee model, on the other hand, contains all trainee actions in their temporal order of occurrence.

Figure 6:
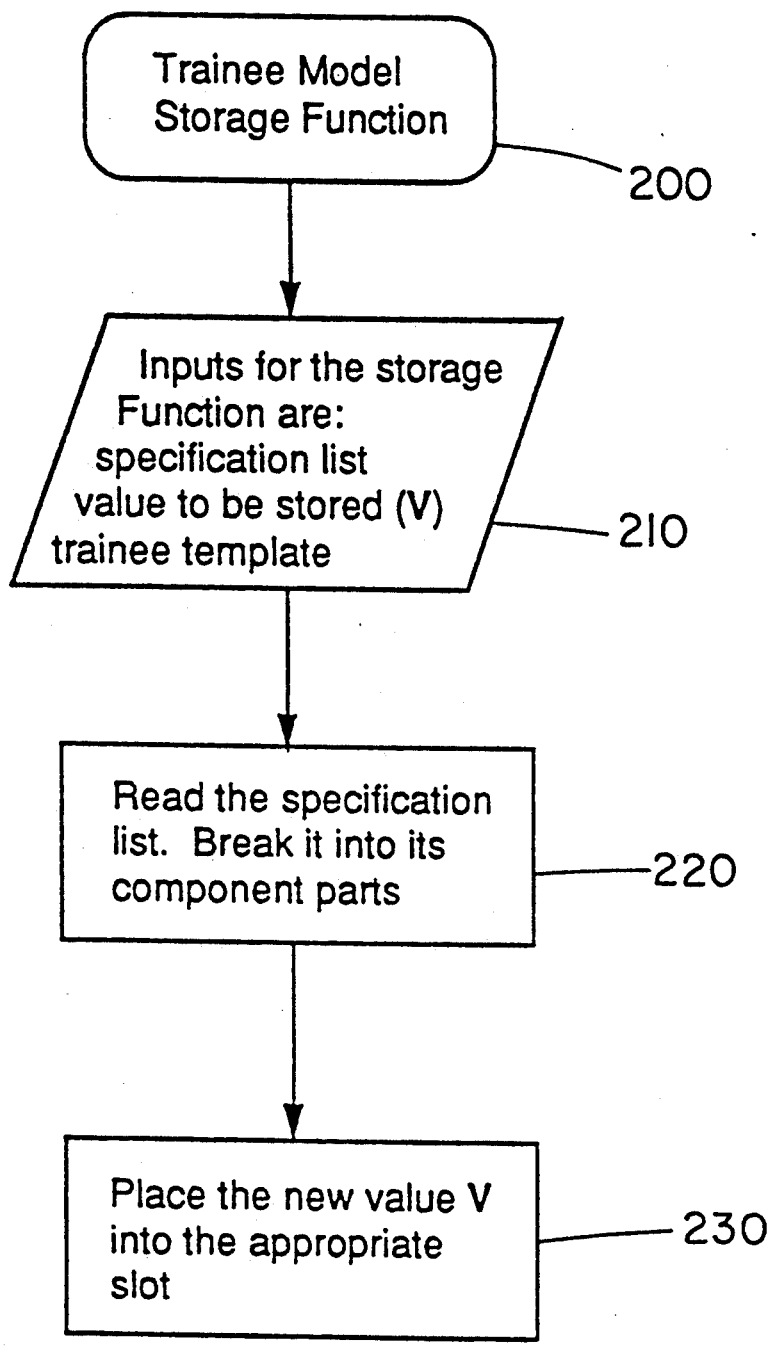
FIG. 6 is a flow chart of the operation of the trainee model of the preferred embodiment of the intelligent computer-aided training system of the present invention.

FIGS. 6, 7, 7A and 8 illustrate the operation of the trainee model 50. FIG. 6 is a flow diagram of the trainee model 50. The trainee model storage function is represented by box 200. Box 210 indicates that the inputs for the storage function are the specification list, the value to be stored (V), and the trainee template. The specification list identifies the "slot" in which the value (V) is to be stored. This list is composed of the step number associated with the current context, an identifier for either the required or optional action, and the name of the action. If the action contains an error, the specification list also identifies the type of error. The specification list is also used to identify trainee requests for help or a back up to a previous step. Box 220 indicates that the specification list is read and the specification list is broken into its component parts. Box 230 indicates that the new value to be stored is placed into the appropriate slot.

Figure 7:
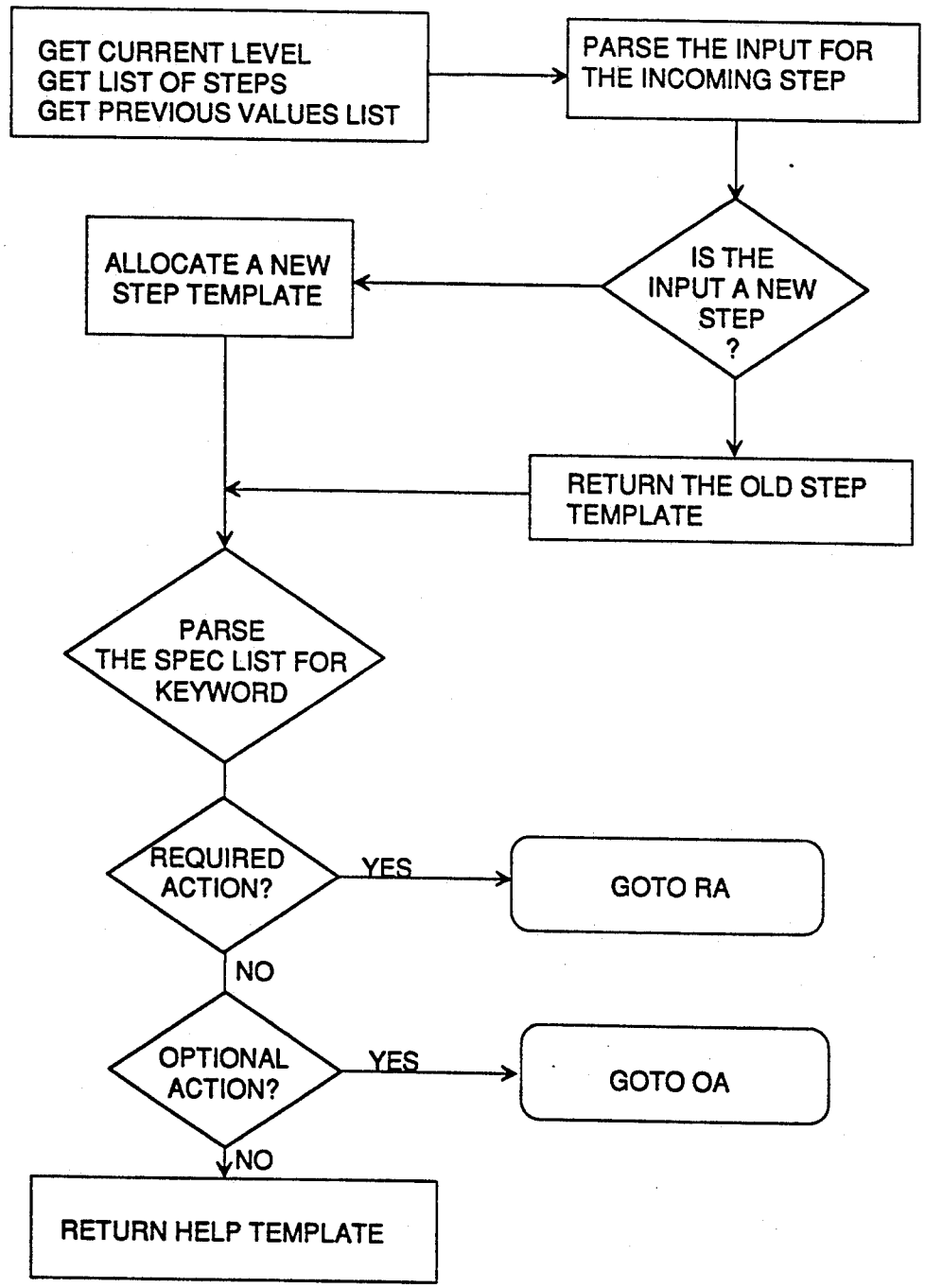
FIG. 7 (including 7 and 7A) is a flow chart illustrating the reading and partitioning component parts of the trainee model as illustrated in FIG. 6.
Figure 7A:
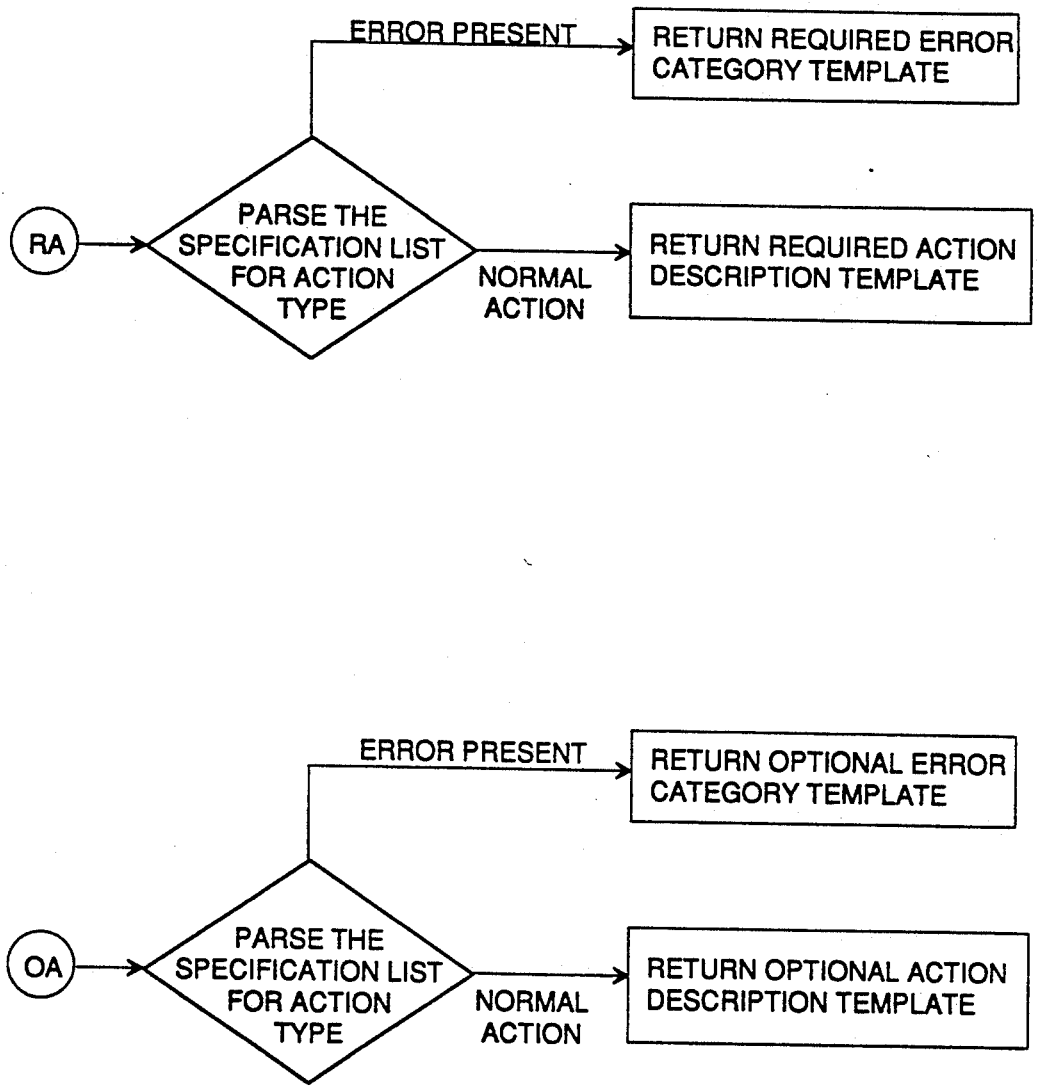
Figure 8:
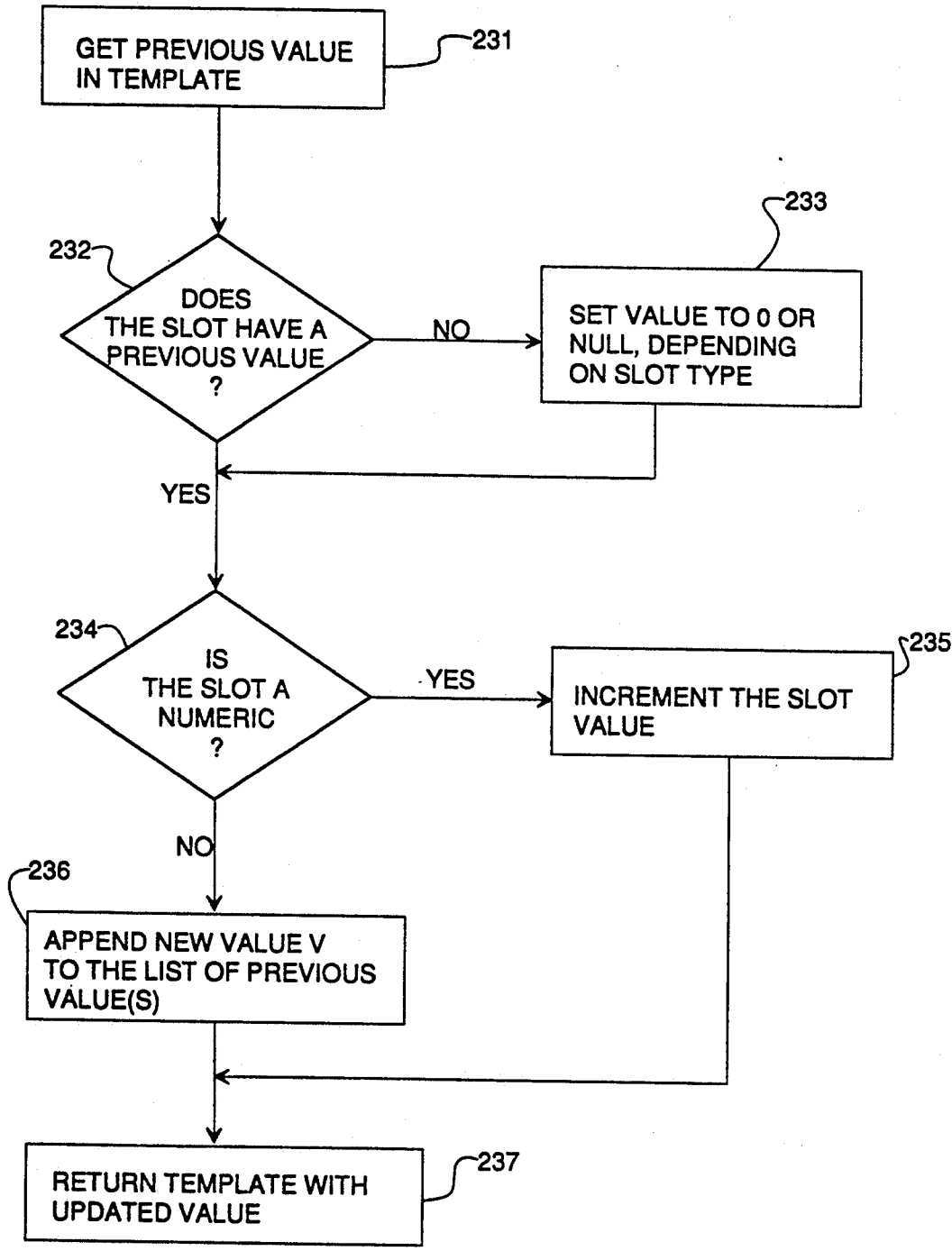
FIG. 8 is a flow chart of the updating procedure of the trainee model as illustrated in FIG. 6.

FIGS. 7 and 7A illustrate in flow diagram form a more detailed view of step 220 in FIG. 6. FIG. 8 is a break down of step 230 in FIG. 6. Step 231 acquires the previous value in the template. Step 232 determines whether the slot has a previous value. With no previous value, step 233 sets the value to zero or null depending on the slot type. If the slot has a previous value, step 234 determines whether the slot is numeric. If the slot is numeric, step 235 increments the slot value. If the slot is not numeric, step 236 appends a new value to the list of previous values. Note that action names have descriptive values. Specific errors are represented by descriptive values whereas general errors are simply recorded by the number of times they occur. All optional actions that are not taken by the trainee are also represented as descriptive lists. Requests for help and back ups to previous steps are recorded by the number of times they occur. Step 237 returns the template with the updated value to complete the placement of the new value in the appropriate slot as indicated in step 230 of FIG. 6.

Once a generic trainee model is defined, the domain specific information is stored in the database. Thereafter, a set of functions is determined that operates on the database associated with the trainee model 50. The functions which operate on the database associated with the trainee model 50 are the retrieve function and the storage function. The retrieve function reads the specification list and parses the keyboard. The trainee model can be traversed by parsing the specification list. The storage function reads the specification list and parses the keyboard and, finally, puts the value to the database. Further, the storage function serves as a locator for putting the new value into the database associated with the trainee model 50.

The training scenario generator 20 is comprised of the training scenario generator expert 22 and a database 24. The training scenario generator 20 designs increasingly complex training exercises based on the current skill level contained in the trainee model 50 and on any weaknesses or deficiencies that the specific trainee has exhibited in previous interactions. The TSG database 24 serves as a repository for all parameters needed to define a training scenario and includes problems or abnormalities of graded difficulty.

The training scenario generator relies upon a database of task "problems" to structure unique exercises for a particular trainee each time the trainee interacts with the system. Typically, the initial exercises provided to a new trainee are based on variants of a purely nominal satellite deployment. Thus, the nominal deployment does not increase the difficulty for the new trainee by including time constraints, distractions or related problems. Once the trainee has demonstrated an acceptable level of competence with the nominal satellite deployment, the training scenario generator 20 draws upon its database 24 to insert selected problems into the training environment. For example, a propellant leak which renders the thrusters used for the nominal separation maneuver inoperable requiring the FDO to utilize a more complicated process for computing the maneuver may be initiated. In addition, time constraints are imposed as the trainee gains more experience. Also, distractions are presented to the more experienced trainee. Distractions may come in the form of requests for information from other Mission Control Center personnel. As in real life experience, typically, distractions are presented at inconvenient times during the task assignment. The training scenario generator 20 also examines the trainee model 50 for particular types of errors committed by the trainee in the current, as well as previous, sessions. The trainee is given the opportunity to demonstrate his newly gained competence by not making repeated errors. As the training progresses, the objective is to present the trainee with exercises which embody the most difficult problems together with time constraints and distractions comparable to those encountered during integrated simulations and actual missions.

The Training Scenario Generator (TSG) 20 has two basic components: a knowledge base and an object-oriented database from which the parameters needed to define a simulation scenario can be assembled. The knowledge base is in the form of production rules that incorporates the knowledge of experienced trainers in determining the skill level of trainees. The Training Scenario Generator 20 knowledge base contains production rules that create a simulation scenario in much the same manner as an expert trainer. These production rules use a knowledge of training strategy and extract information from a database of nominal scenario parameters, problems, constraints, and distractions. The scenario is defined by an object that consists of the elements that each scenario must contain. Training strategy rules examine the trainee model and decide on the appropriate range of nominal parameters, the need for and appropriate range of non-nominal parameters, the appropriate set of potential problems, and the nature of time constraints and distractions. Nominal and non-nominal parameters are generated "randomly" within predefined constraints while problems are directly taken from a set of problems, keyed to the trainee skill level, identified by the training strategy rules.

In order to provide the parameters required to define a simulation scenario, a general-purpose object-oriented database is provided to work with the TSG knowledge base. At its most basic level this database contains numerical and textual information that, taken together, can define the fundamental nature and context of a simulation. In addition to this collection of data, procedures are provided to combine the basic data to create the TSG database.

The TSG database is composed of Resources, the Basic Competency Mixin, the Basic Task Mixin, Generic Tasks, Specific Tasks, and Complex Tasks. A detailed description of each class of object and its relationship to other classes of objects is given below.

Instances of class store the basic data elements that are required to define a scenario. Each Resource Object class has the following attributes and associated function:

| Name | the name of the specific scenario data element. |
|---|---|
| Type | each element is assigned to type numeric, range, or list. Type numeric refers to an element with a single specified value. Type range refers to an element that can be randomly generated but whose value must fall within a specific range. Type list includes strings of alphanumerics or collections of numeric values. |
| Upper bound | the upper limit that can be taken by an element of type range. |
| Lower bound | the lower limit that can be taken by an element of type range. |
| Select Function | a procedural function that takes as an input argument the level of the trainee, then computes (if necessary) a value for this element based on the type specified. |

Figures 9, 10:
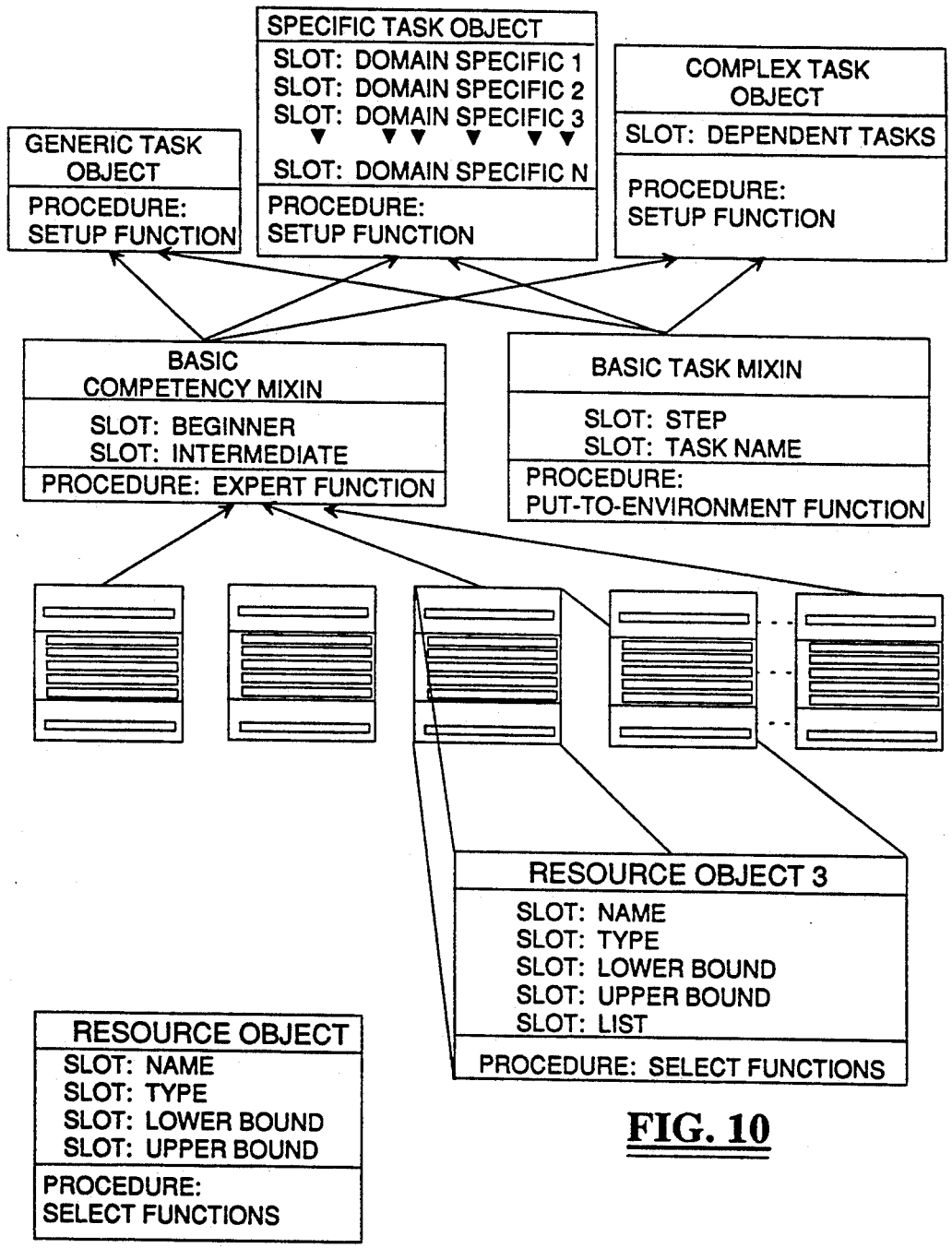
FIG. 9 is a schematic illustration of the resource object used by the training scenario generator component of the intelligent computer-aided training system of the present invention.
FIG. 10 is a schematic illustration of the use of the resource object illustrated in FIG. 9 in conjunction with the mixing and task objects as used by the training scenario generator component of the intelligent computer-aided training system of the present invention.
Figure 11A:
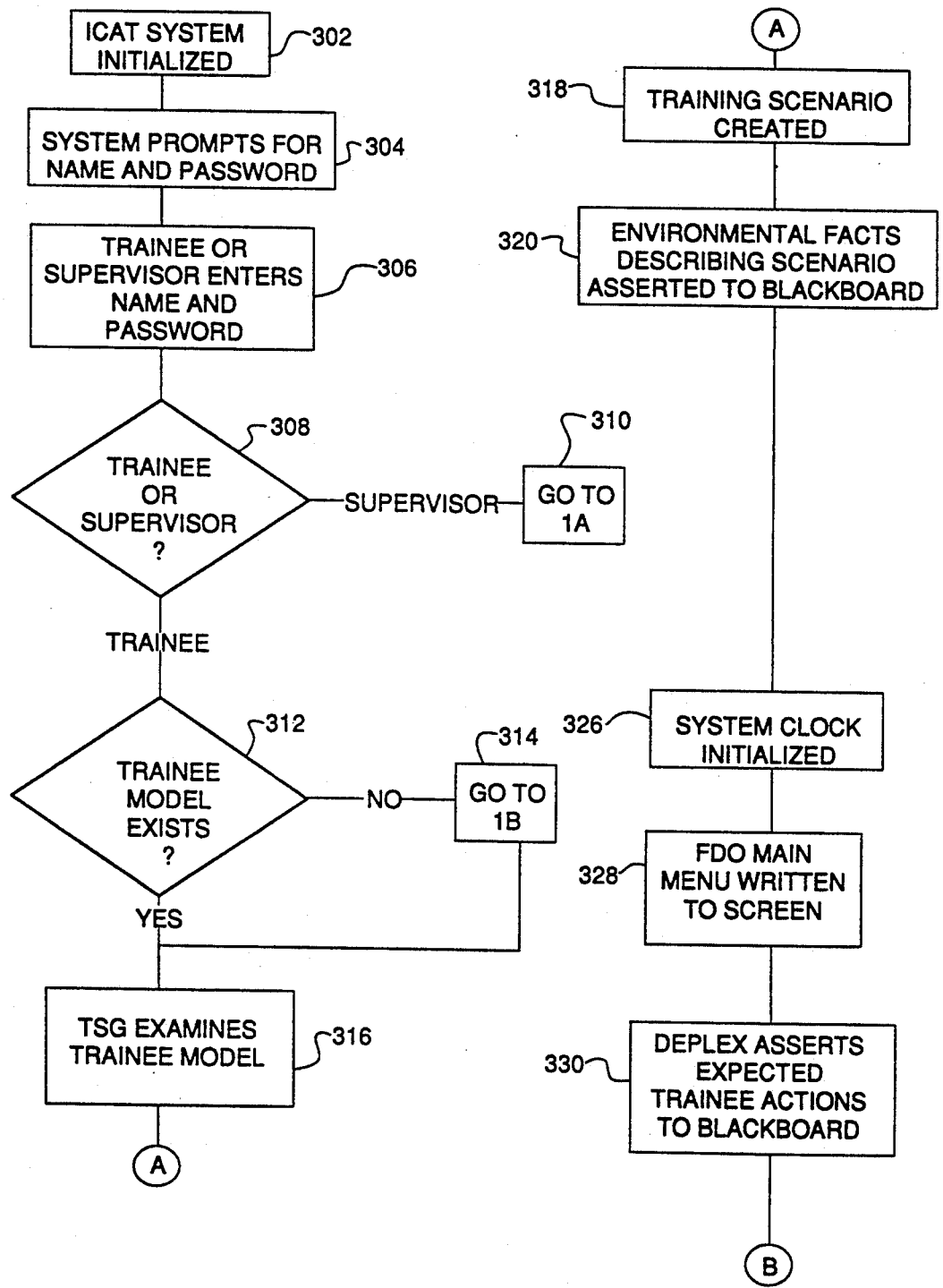
FIG. 11 (11A through 11H) is a flow chart of a basic trainee session for the preferred embodiment of the intelligent computer-aided training system of the present invention.
Figure 11B:
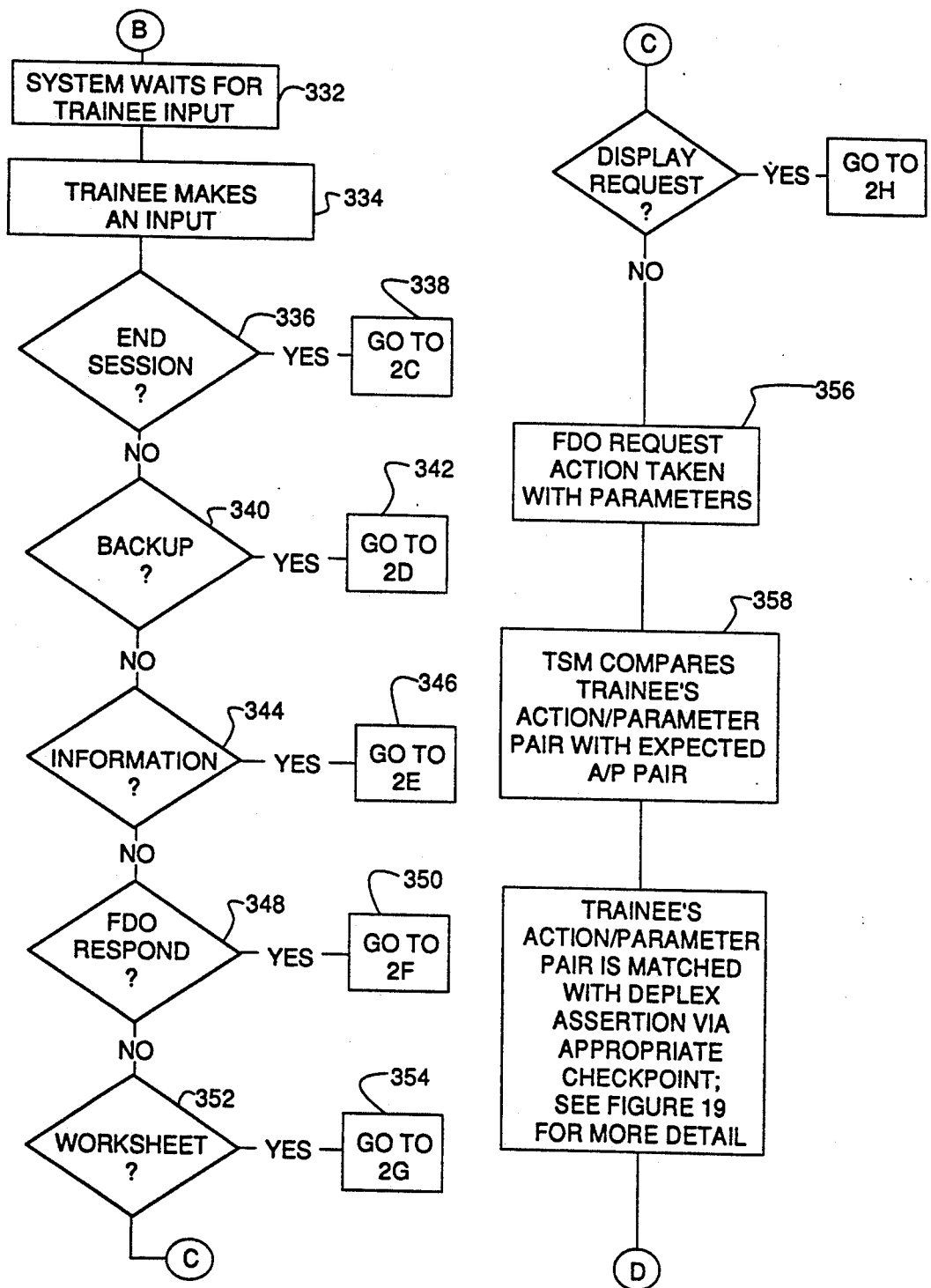
Figure 11C:
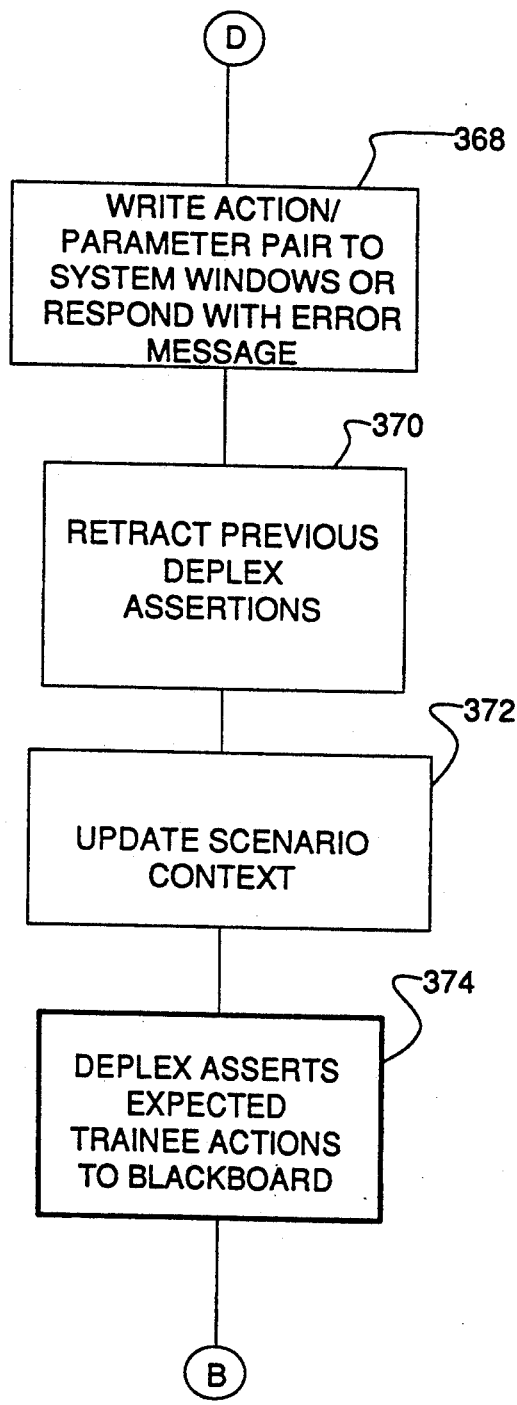
Figure 11D:
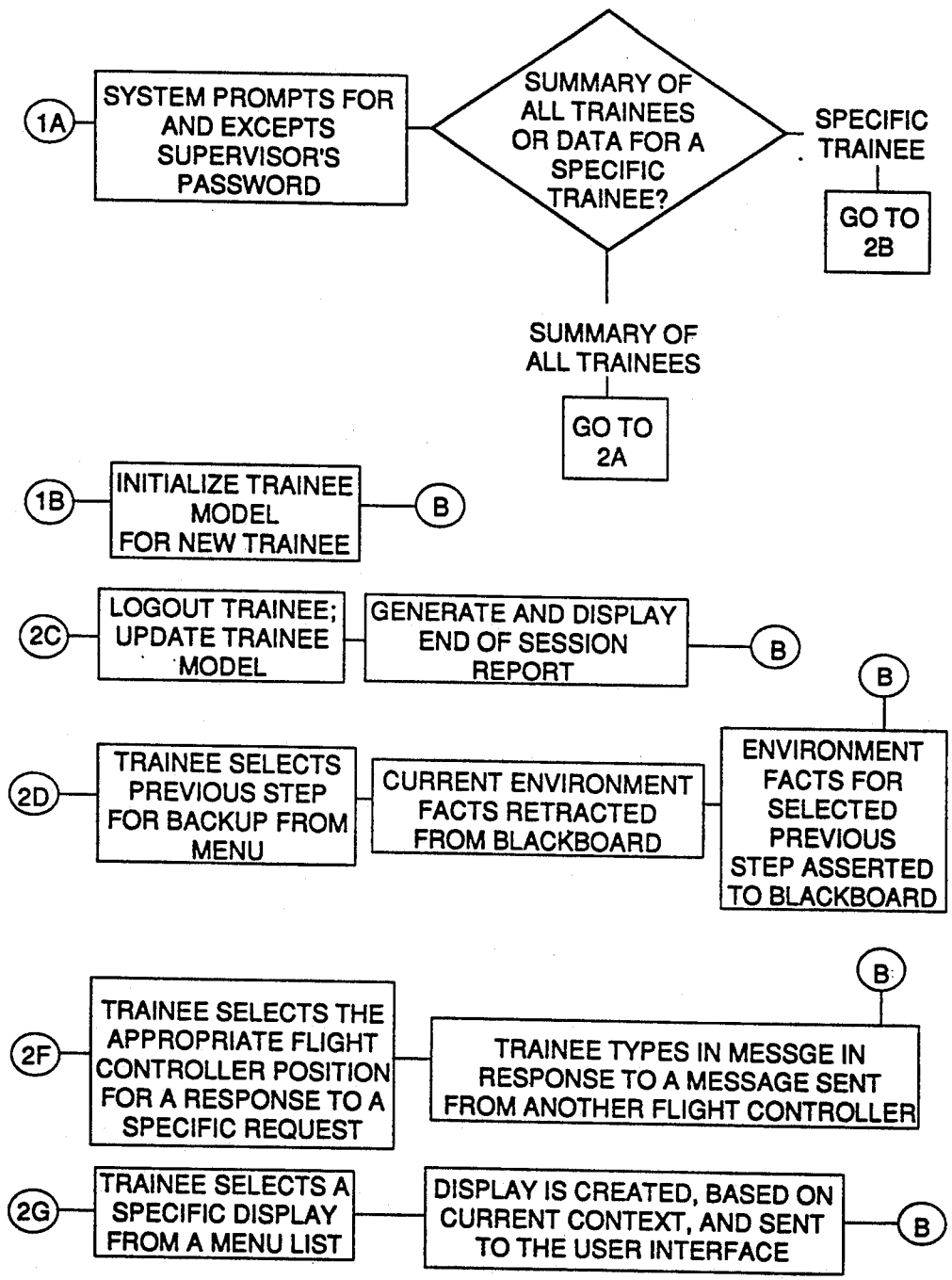
Figure 11E:
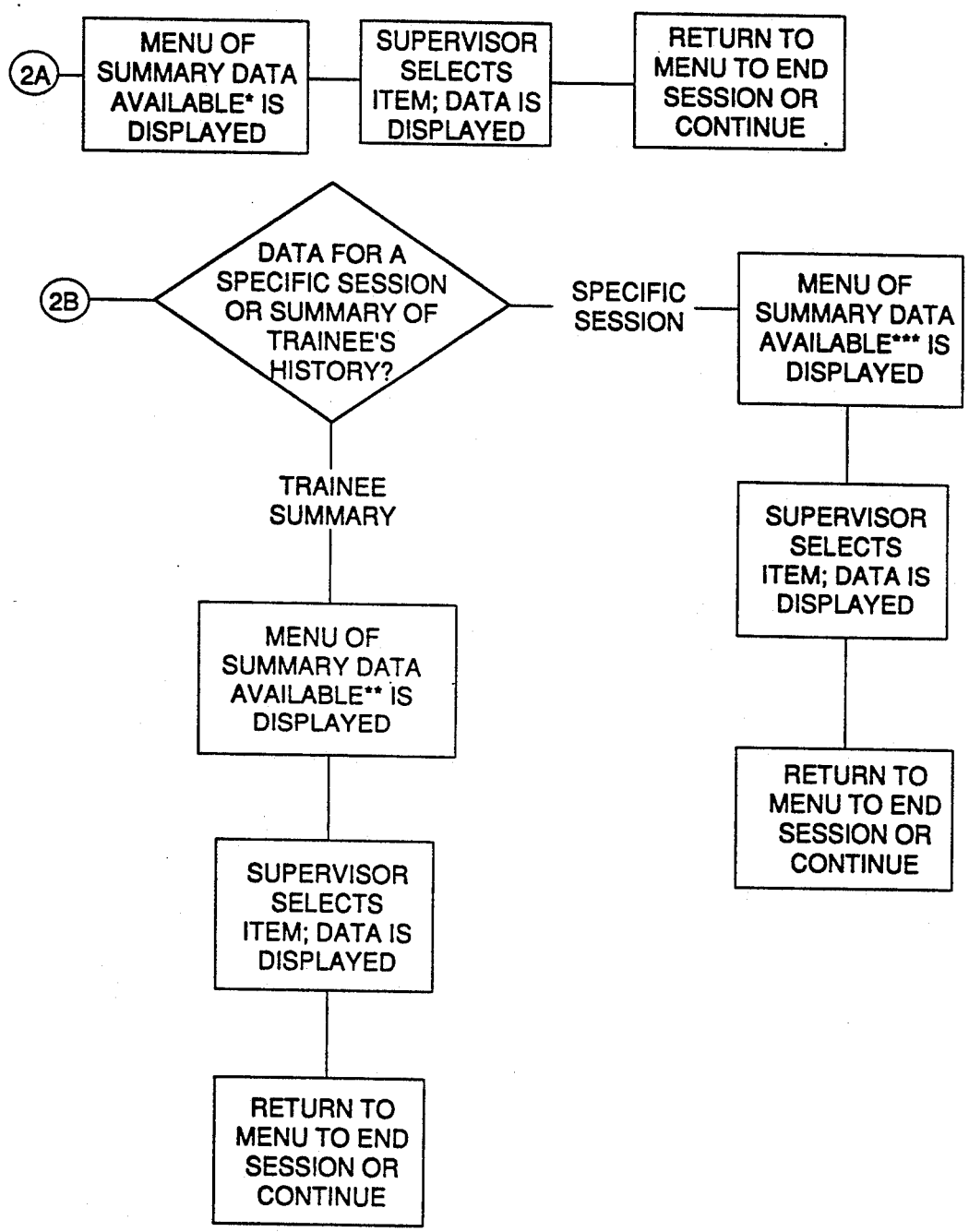
Figure 11G:
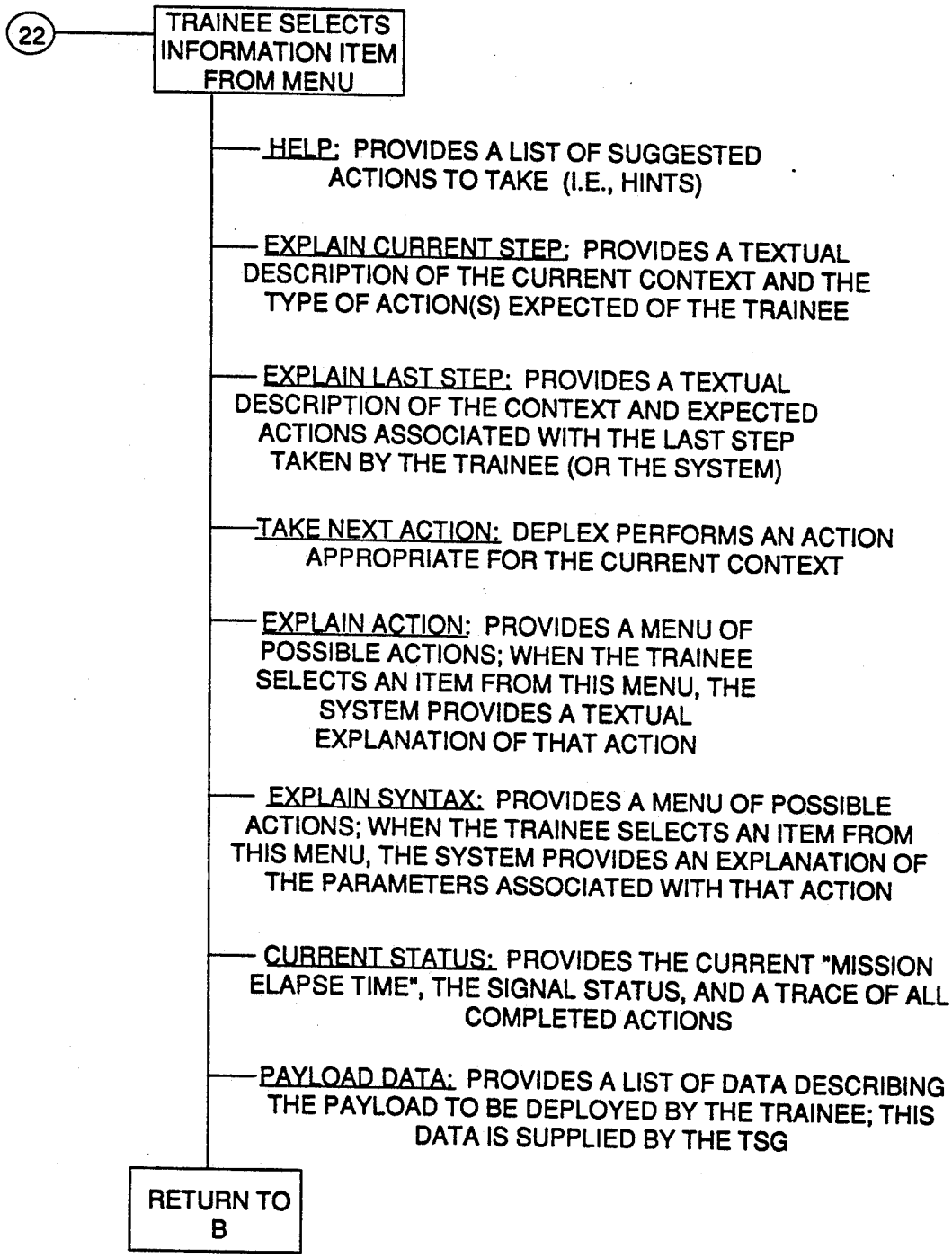
Figure 11H:
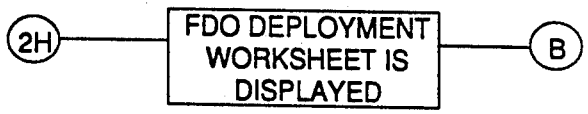

FIG. 9 is a schematic illustration of the Resource Object structure. In the case of the PD/ICAT system, resource objects were created that stored such data items as the name of a satellite and value ranges for such items as satellite mass, cross-sectional area, and drag coefficient.

A "mixin" is a class of objects that cannot stand alone but has to be combined with other classes of object. In the TSG object database, the purpose of the mixin class is to collect instances of Resource Objects into one or more of three levels of competency (as defined by the TSG knowledge base):

Beginner: a set of Resource Objects that can define scenarios appropriate for the task novice;

Intermediate: a set of Resource Objects that serve as the basis for scenarios appropriate for a trainee who has demonstrated mastery of beginner scenarios;

Expert: a set of Resource Objects that combine elements from beginner and intermediate resource objects.

The use of the term expert above requires explanation. In the present embodiment of the invention, two basic levels of competency were deemed adequate from the perspective of creating simulation scenarios. The expert category mentioned above actually represents a "mixture" of both beginner and intermediate scenario elements that would be typical of the real-world task environment. The structure of the TSG object database permits the assignment of expert to a unique set of Resource Objects. Alternatively, this level could be eliminated or additional levels of competency could be added.

The purpose of the Basic Competency Mixin is to group all instances of Resource Objects needed to define the context of a specific task into the competency categories that have been created. The Expert Function procedure has the necessary knowledge to perform the actual grouping of Resource Objects into appropriate competency levels.

This mixin class is also dependent on other classes of objects. As the trainee initiates and then proceeds through the training scenario, the environment facts found in the blackboard inform the TSG 20 of the next step and the associated task(s). The Basic Task Mixin uses this information to relate the task object with the step number and task name and to define a procedure, called "put-to-environment." This function accomplishes the "posting" of the parameters contained in the instances of task objects to the blackboard in the form of new environment facts that drive the simulation and establish the context for domain expert and system manager components of the intelligent training system.

The Generic Task Object class of objects inherits the Basic Competency Mixin and the Basic Task Mixin. Thus, this class has all the characteristics of both of those classes of objects. Its purpose is to provide and integrate all elements needed to define into an instantiable task object the context associated with a specific task in the training session. The production rule component of the TSG need only determine the trainee's competency level in order for an appropriate scenario definition to be posted to the blackboard 60. This latter operation is accomplished by the setup procedure. The Generic Task Object is created whenever the elements which define the scenario context have no interdependency.

The basic structure and relationships of the mixin, task, and resource objects are illustrated in FIG. 10.

The Specific Task Object class of object serves much the same function as the Generic Task Object class but performs local computations to satisfy specific task requirements. A class of Specific Task Objects is created whenever one or more of the elements required to define the scenario context are interdependent. The setup function is also used to transfer the elements of this object to the blackboard 60.

The class of Complex Task Objects contains multiple task goals. The slots labeled dependent tasks contain these multiple goals. In this case the setup procedure acts on each dependent task to place its elements into the blackboard. It is this object class that can insert problems of the appropriate difficulty for a specific trainee. This type of task object is instantiated when the context for an entire set of tasks (specific or generic, as defined above) must be created at one time.

The TSG object database is a general-purpose mechanism for constructing the context needed to define a simulation scenario. The database may be used to provide initial data to a simulation and to dynamically determine additional input parameters during the course of a training exercise. The structure of the TSG object database is completely independent of the training task. The developer of a specific intelligent computer-aided training system must provide the requisite Resource Objects and define the Expert Function that is needed to distinguish the competency level(s) to be associated with each Resource Object. The other functions are domain independent.

The ability to automate the development of the input parameters required to produce a challenging simulation scenario targeted at a specific trainee can greatly enhance the efficiency and efficacy of intelligent training systems. The approach described here can be applied to additional ICAT applications for very different training tasks. Ultimately, the system of the present invention will be integrated with a software development environment that will aid trainers in adapting the general-purpose ICAT architecture to their particular training domain and in providing the data and knowledge required by the object database to create simulation scenarios.

FIG. 11 (including FIGS. 11A through 11H) is a flow chart illustrating a typical trainee session. Step 302 indicates the initialization of the intelligent computer-aided training system. Step 304 provides that the system prompts for the name and password of the trainee. Step 306 requires that the trainee, or alternately the supervisor, enters a name and password. Step 308 evaluates whether the user is a trainee or a supervisor. The present flow diagram only considers a trainee session, but a supervisor session would be equally appropriate where applicable. Step 312 indicates whether a trainee model has been developed by the trainee model 50. Assuming the trainee model exists, step 316 provides that the training scenario generator 20 rules are examined. Step 318 provides that a training scenario is created. Step 320 asserts the initial scenario to the blackboard. Step 326 provides that the system clock is initialized. Step 328 writes the main menu to the screen for view by the trainee. Step 330 indicates that the domain expert 10 asserts expected trainee actions to the blackboard. The system waits for the trainee to input his information (step 332) based upon the menu which was written to the screen (step 328). The trainee inputs his action (step 334). The blackboard is evaluated to determine whether all rules have fired (step 336), if help is needed (step 340), if information is needed (step 344), if the trainee responds (step 348), or if a display or process request is outstanding (step 352). A request to another flight controller is given (step 356). The training scenario generator 20 compares the trainee's action/parameter pair with the expected action/parameter pair (step 358). The action/parameter pair is written to the system window (step 368). The previous domain expert assertions are retracted from the blackboard (step 370). The scenario context is updated (step 372). The domain expert asserts expected trainee actions to the blackboard based upon the new information which has been asserted to the blackboard. The remaining steps are expressly defined in FIG. 11. The cycle continues until all rules which can fire are fired.

OPERATION

The general purpose architecture utilized for developing the preferred embodiment of the intelligent computer-aided training system focused on the deployment of a satellite from a space shuttle. Although specific hardware was used in the development, it can be appreciated by anyone skilled in the art that various and sundry types of hardware currently available or which may ultimately become available could be readily substituted for those used to practice the present invention. The system was developed on a Symbolics ® 3600 Series LISP computer. The Symbolics ® 3600 computer utilizes software comprising ART ® and LISP. The presently preferred embodiment of the present invention has also been implemented on a Unix-based work station. In the Unix work station environment, the procedures written in LISP software have been rewritten in C. Further, production rules have been converted from ART ® to "CLIPS" software. CLIPS is an acronym for "C-Language Integrated Production System" that was developed by the Software Technology Branch, Mail Code FM 51, NASA/Johnson Space Center, Houston, Tex. 77058. The present activities of utilizing a Symbolics ® and a Unix work station environment are part of a larger project directed at continuing research in general-purpose development environments for simulation-based intelligent training systems. In each machine's environment, the general purpose architecture has been fashioned around a modular expert system approach in an effort to isolate its domain-dependent elements from those that apply to any simulation-based training system.

SYSTEM CONTROL CHARACTERISTICS

The general purpose architecture of the present invention is based upon a production rule software implementation. The general purpose architecture provides that groups of rules can be active in what appears to be "simultaneous" fashion. The control structure implemented provides for the optimal relationship between the modules of the intelligent computer-aided training system such that the domain dependent knowledge can be sufficiently isolated from the domain independent knowledge. The control structure of the present invention enhances the isolation of domain dependent from domain independent knowledge.

Figure 13:
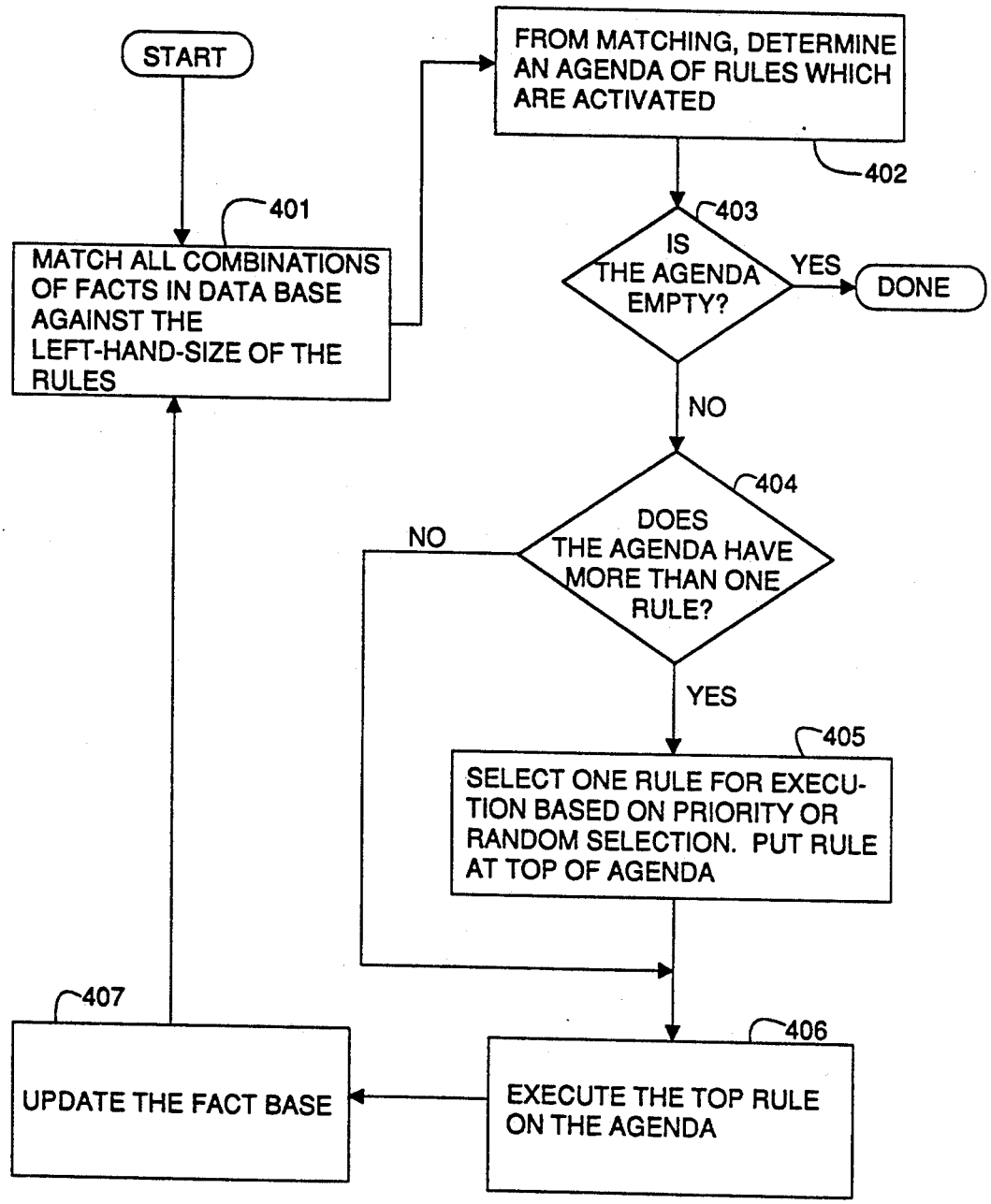
FIG. 13 is a flow chart illustrating the Rete algorithm associated with the control structure of the preferred embodiment of the general purpose architecture for intelligent computer-aided training.

The basis for the organization of the present invention is the use of the Rete algorithm. The Rete algorithm is explained more fully in the article by C. Forgy, :Rete: "A Fast Algorithm for the Many Pattern/Many Object Pattern Match Problem," in Artificial Intelligence, Vol. 19, No. 1, Pages 17-32 (1982). FIG. 13 is a flow chart of the operation of the Rete algorithm. It should be noted that the present system is based upon "rule-based programming" whereby a "left-hand side" provides pattern matching and the "right-hand side of rules" provides actions. In its most simple form, the utilization of FIG. 13 represents the necessary ingredients for any programming language used to implement the present invention. Thus, similar systems can be implemented utilizing the general purpose architecture of the present invention with software which has not yet been developed, but whose principles are based upon the Rete algorithm or other schemes for rapid pattern matching. Thus, a programmer could write his or her own language or routines to implement the features which describe the present invention, but the control structure for implementing the general purpose architecture would be similar. Thus, any general purpose architecture which utilizes intelligent computer-aided training based upon the present control structure would be within the scope of the present invention.

The control structure of the present invention is implemented with a rule-based language having the familiar parts: data and process. The data is represented as facts and the process as inference rules. The operation of a rule-based language is two-fold: (1) match all fact combinations against rule patterns to determine which rules may fire, then (2) pick one rule for execution and update the fact base. The process is repeated until no rule can fire.

Not every rule-based system will look the same or have the same syntax for facts and rules. The language ART®, for example, requires that relation names be satisfied first in a template description of a relation whereas CLIPS has no relation syntax at all. However, all rule-based systems will share the common feature of having rules which match facts (in some format) through some pattern matching scheme as does the present invention. The control structure of the present invention is based on two primary observations. First, it is important to point out that the present invention has multiple sets of rules which act in concert to implement the system. This is done so that each set of rules can be considered a module which can be "adapted" to produce new and/or different systems. Consequently, if it is desirous to make changes to the domain expert 10 set of rules, the other sets of rules may be changed little, if at all. This is true even if the entire domain expert 10 is replaced with a new domain expert.

The present invention utilizes multiple sets of rules so that they communicate. Communication is provided based upon a message passing protocol. The message-passing protocol is provided for all the rule sets which are being used. Thus, one of the primary design choices for the control structure of the present invention is to have a common interface through which the various and different rule sets communicate.

The control structure of the present invention requires the use of a message-passing protocol by independent rule sets for communication between different rule sets.

The fact that the general purpose architecture of the present invention is based upon building an intelligent training system for procedural tasks is important. The control structure utilized in the present invention is readily adaptable to training systems having definite "steps" which can be characterized as having a particular context. These steps may repeat or the steps may be skipped over as different individuals interact with the system. Nonetheless, the tasks adaptable for use by the present invention can be decomposed into a finite number of definite steps. The finite number of definite steps can be specifically enumerated. The assumption of procedural tasks is the second design choice utilized to implement the present invention.

Tasks which are implemented utilizing the present invention are assumed to be or can be described as procedural or step-by-step in structure. Thus, the requirement of a message passing protocol used by independent rule sets for communication and the procedural or step-by-step structure of the tasks imposes restrictions on the format of the messages which are passed between the various rule groups of the system. First, some part of each message must contain information regarding both which rule group has sent the message and which rule group or groups should use the message. Although the details of this part of the message will change from system to system and may be readily modified by those skilled in the art, their presence is required. Next a portion of the message must contain the context or "step" of the process to which the given message applies since it is assumed that the message will implement a procedural task. Again, the portion of the message containing the step or context can vary in form, as is readily apparent to those skilled in the art, but must be present to operate within the scope of inventive concept. Finally, the contents of the message itself must be passed from rule group to rule group.

In practicing the present invention a message takes the following form:

(message-source message-targets step message-contents).

The fields shown in the above message can be in any order or can even be combined into single fields. For example, the first two fields above could be combined to form a single field with an encoding of "from" and "to" rule sets. In the intelligent computer-aided training system implemented with the general purpose architecture of the present invention, the messages utilized were in the following form:

| (message-D-to-I | <step> | <type> | <components>) |
|---|---|---|---|
| source/target | step | | contents |

The portion "message-D-to-I" is the relation name indicating both the sender and receiver of the message. In the present example this format is a message between D for the domain expert 10 and I for the training session manager 30. Further, the term "<step>" holds the step number at which the message is applicable. Finally, the last two fields hold the contents of the message. It can be readily appreciated by those skilled in the art that any particular ordering or combination of the above components can be used as long as the message contains source/target, step and context information.

The present invention utilizes eight different kinds of control rules which are all based upon the message format as above described. As previously discussed, the details of any of the rules may change from one implementation of control structure to another, but the need for the various kinds of attributes shown in these rules will not change. Examples of attributes are: step attribute, from attribute to attribute, etc.

Given the message format described above, several types of control rules can be defined which guide the execution of the program. First, some rule must exist which changes the context or "step" of the process. Without such a rule, the system would never get anywhere. This rule is referred to as a standard matching rule which matches the user's (or other outside) input with what the system is expecting. The standard matching rule is, in general, what increments the system to the next step of the process. However, it may be the case that some matches, such as optional actions, merely update the fact database and are not required. Standard matching rules can be written for as many different types of context changes as are needed by the system.

All such matching rules will check for similarities between two or more messages, whose format will dictate the pattern matching specification (or left-hand-side) of the rule.

EXAMPLE

Standard matching rule:

IF (DomainEx-to-TSM step-5 required-act action-a)
    (Interface-to-TSM step-5 action-a)

THEN

...
    send message to student model for action-a
    increment the step to step-6
    ...

Note that in the example of a standard matching rule, the left-hand-side matches messages from two different rule sets (here, the domain expert and the user interface). What matches between these two messages is the step number and the message contents (shown above as "action-a"). All standard match rules will have these same characteristics on the left-hand-side of the rule.

When the user types an input, it is converted to message format by the interface using input conversion rules which are then checked against the expected actions generated by the domain expert set of rules. Because of the message format, the input conversion rules are also of a standard form. All inputs to the system must be translated to the message passing format, thus the right-hand-side of all such rules (where facts are asserted) will be identical.

EXAMPLE

Input Conversion Rule:

IF

...
    match on trainee input from interface;
    input will be some pattern asserted by
    trainee interface
    (step step-num)
    ...

THEN assert: (Interface-to-TSM step-num action-a)

Note that the right-hand-side of this conversion rule asserts a message that matches the left-hand-side of the standard matching rule. The result is the conversion of a trainee input (which may be in some special form unique to the interface) to a message that is understandable by the other rule sets of the system.

Clean-up rules check for facts that are identified by a step number which is no longer applicable and throw such facts away. The clean-up control rules are extremely important because they keep the size of the blackboard or fact database small, which allows the program to run quickly. This clean-up facility also allows the system to make massive, blind assertions at each step of the process, thereby generating a variety of possible paths for the user to engage. Whatever paths are not taken will simply result in old facts (i.e., facts identified with a previous context) being cleaned up or retracted automatically. All clean up rules will have similar formats on both the left-hand and right-hand sides. The left-hand side will match for facts with steps which are "behind" or in some way out of context, and the right-hand side will retract those facts.

EXAMPLE

Clean-up Rule:

IF

F = (Domain Ex-to-TSM step-X <any-type> <any-message>)
    (current-step step-Y)
    condition: (Y > X)

THEN

...
    (retract fact F)
    ...

An important assumption which can be derived from the clean up rules is the idea of "environment." A clean up rule operates on the assumption that there will come a time when a message asserted at step X will no longer be needed in some way (alternatively, it may be saved in a location different from the working database of message facts, such as a student model). In short, the current "environment" in which the rules operates no longer requires the message to be present in its current form.

Many procedural tasks have this property; namely, the current context of the problem changes from step to step. In the present software, once an action is taken by the trainee it is reasserted as a more permanent "environment" fact which can be referenced by subsequent rules for information on what has already occurred. Any action which is not taken by the trainee is thrown away when cleaned up. The point is, by labelling messages or other step related facts with a step number, one can easily define rules which can do away with facts or otherwise alter the fact base as new steps are taken in the process. This keeps the fact base representing the current context small which allows the rule sets to operate more quickly since there are fewer facts to examine during the matching stage.

Backup control rules can also be written based on the elements of the message protocol. Assuming that the steps of the task get larger as the task is successively completed, the system can be reversed to any particular point of its execution by forcing a cleanup of all facts which have been stamped with a step after the desired step. This is the reverse of the cleanup rules, where facts with old (lower numbered) steps are deleted. Cleanup extends to any previous step, and can be made to effect whatever information is stored in the more permanent environment if the environment fact is so labelled with a step.

EXAMPLE

Backup Rule:

IF

F = (<any message type> step-X <any message contents>)
    (backup-step step-Y)
    condition: (Y < X)

THEN (retract fact F)

Backup control rules are almost identical to clean up rules. The only difference is the condition placed upon the relationship between the step of the message and the target step (i.e., current-step or backup-step). Clean up operates on messages which are behind in time; backup operates on messages which are ahead in time. Backing up can be controlled very precisely. For example, the system of the present invention has rules for backing the program up one step on particular errors made by the trainee. Specifically, when the trainee makes an error which he/she has made in the past, the system can back up one step and ask the user to perform the action over. This "fine tuning" allows us to reinforce various steps of the process based on the trainee's needs and is a very powerful paradigm.

In general, by having a procedural task (along with the message format described here), it is possible to generate a control structure which can place the procedure at any arbitrary point. This allows for iteration of the process, backing up of the process, or even random jumping ahead. For training purposes, arbitrary positioning means that the system can be used in a variety of ways. It can be used as a repetition device for memorization or rehearsal. Alternatively, it can be used to help more experienced trainees review problem areas by arbitrarily starting them at any point in the process or by skipping over those areas which are "easy." Finally, as a general tactic, the backup facility allows the system to restart the procedure at any arbitrary point with any arbitrary configuration. Thus the backup facility could be used to "search" for possible answers by starting the procedure at various points with different environment facts to see which alternative bears more fruit.

An iteration rule is simply a special case of a backup rule which either backs the system up to a previous stage or allows it to move ahead. Iteration rules can be implemented as rule pairs (one rule to back up on condition-a, another to go ahead on condition-b, etc.) or as a single rule with the conditions on the right-hand-side.

Special match rules perform a specific task triggered by a specific context. Special match rules are currently needed to override the standard match rule to "jump" the system ahead to an arbitrary step. Typically such rules are tied to a particular domain and are not portable from system to system. However, all special match rules match on particular messages and, consequently, have similar left-hand-side formats.

EXAMPLE

Special Match Rule:

IF (DomainEx-to-TSM   step-5   required-act   action-a)
   (Interface-to-TSM   step-5   action-a)

THEN

...
   send message to student model for action-a
   perform actions SPECIFIC TO THIS ACTION
   ...

The structure of special match rules is identical to that of standard match rules. The two are distinguished by a default mechanism: if no special match rule can fire then the standard match rule is used instead. Many rule-based languages have such a defaulting feature (normally it is called salience) whereby rules may be labelled as more or less important than other rules. This ranking is used when deciding which rule to select for firing.

Outside-request rules match trainee requests which fall outside of any action recognized as part of the actual task being trained. For example, a request for explanation or help is not part of the specific task for which training is implemented and thus falls into the category of outside request. Each outside-request rule has a different format, depending upon what features the system provides for the trainee, for example, step explanation, action explanation, and current status (i.e., which actions have been successfully completed).

Context switching rules are set at the lowest possible salience (default value) which the rule based language allows, thus they are the very last candidate rule to be run. This means that a context switching rule will fire only if no other rules can fire. Constructed in this fashion, a context switching rule can be used to switch the system between rule sets which are currently executing. This feature is essential whenever one has multiple sets of rules interacting at the same time.

Whenever multiple sets of rules are interacting, one must have some means for differentiating between the sets of rules. Preferably, each of the sets of rules should fire independently, yet not step over one another. As a result, the idea of context was developed. A context is simply a fact, like any other fact, which is present in every rule of the system. There are exactly as many "contexts" as there are different rule sets. Thus all the Domain Expert rules have the domain expert context fact, namely

IF

...
   (context   domain-expert)

THEN

...

which separates them from other rules. Now, when the fact "(context domain-expert)" is asserted, only the domain expert rules will be able to fire. This provides the capability of "turning on and off" different rule sets as they are needed. Note that the context fact is always placed as the last pattern of the left-hand-side of a rule. This is an extremely important, if somewhat technical, point.

When matching a rule to determine if all its patterns are present in the fact base (and it is, thus, a candidate for firing) the left-hand-side patterns are matched in a particular order. Usually, this order is first-to-last. Consequently, whatever pattern is first must be matched successfully before any other matches are event attempted. By putting the context fact last it allows all rules to match at the same time; then when the context fact is asserted the rules are ready to fire immediately. This saves a great deal of time since the rules of different rule sets can be matching against the patterns in the fact base in parallel.

A context switching rule, then, is simply a rule which retracts one context fact and asserts another. As an example, the following rule:

EXAMPLE

Context Switching Rule:

IF

F = (context   domain-expert)

THEN (retract fact F)
   (assert   (context   training-session-manager))

changes contexts from the domain-expert set of rules to the training session manager set of rules (these context facts are called checkpoints in the PD/ICAT system).

Also of importance in the present invention is the rule set that deals with error detection. Typically, messages are passed between the various rule groups of the system. Although, the message format does not matter with respect to the organization of the control structure, the message format greatly affects the way in which errors are detected. The present invention has a general error detection scheme based upon a particular kind of message format.

Recall that the messages passed among rule sets took the following form:

(message-source message-targets step message-contents).

Unlike the first three fields of the pattern (which are used by the control structure), the last field(s) of the pattern indicate the actual message communicated between rule sets. When a trainee takes an action, the results are encoded in the message-contents portion of a message which is sent from the input conversion rules to the training session manager 30, which attempts to match the trainee action to one of the actions predicted by the domain expert 10. If no successful match is made, the system calls the error handler rule set to which it passes the same message contents.

The contents of a message are assumed to be hierarchical in structure. Furthermore, this hierarchy is assumed to be of the form (action parameters) where each parameter may itself be an action. As an example, say the trainee made the following action:

call support personnel
request a vector from navigation
place the vector in slot V39

This action can be viewed as a hierarchy of two actions, each expressed as action/argument pairs:

(call-support place-vector request-navigation)
(place-vector slot-V39)

which, altogether, might be translated to (call-support (place-vector slot-V39) request-navigation).

All actions in the present system are assumed to be of this type. Thus, the message format would be stored in fact format as a straight list of items:

(... call-support place-vector slot-V39 request-navigation ...)

where a message can be any number of fields long. The error handling rules break this format into the logical action/argument pairs described above. Notice that the flat message format does not provide any information about which arguments belong with which action. This will be different for each action of each system, but the method of splitting messages into action/argument(s) pairs can be identical from system to system. All that is needed is a list of the actions and how many arguments each takes and the same recursive routine can do the rest. For example, given the list:

(ace bar cache demo educe fix)
and the following action/#-arguments list:

| action | #-arguments |
|--------|-------------|
| ace    | 3           |
| bar    | 1           |
| demo   | 1           |

It would be relatively simple to break the action into the following components:

(ace bar demo fix)
(bar cache)
(demo educe)

or, perhaps more clearly, "(ace (bar cache) (demo educe) fix)." Furthermore, if given a different action/#-arguments list:

| action | #-arguments |
|--------|-------------|
| ace    | 2           |
| bar    | 3           |
| educe  | 1           | then the message would be divided as (ace bar educe)
(bar cache demo)
(educe fix)

or (ace (bar cache demo) (educe fix))

So, it is possible to write one set of universal routines for breaking a flat message format into its component parts using a table (specific to a particular system) of action/#-argument(s) values as a guide.

Once done, the actions are checked by the error handler expert starting with the topmost action ("ace" in the above example). This is done based on the theory that if a trainee makes a mistake at a high level, the lower level details are probably not important. Said another way, to report that the details of some lower level action were wrong when the lower level action should never have been taken in the first place seems rather pointless. The error handler expert thus finds the highest-level error made by the trainee, which it records in the trainee model before printing a response to the trainee.

As stated earlier, the programming language used for writing rule-based programs require an underlying control structure for pattern matching. Many of these programming languages use the well-known Rete algorithm. The Rete algorithm allows the code to be written in terms of rules and facts. Rules are equivalent to conditional sentences and consist of two parts: an antecedent and a consequent. The antecedent matches facts which have been asserted to a database of facts. The matched facts represent the conditions under which the rule is said to be activated. If the rule is activated, the rule may fire. A rule firing means that its consequent is executed. A rule's consequent may perform any number of actions such as updating windows on the screen, performing calculations on data matched in the antecedent, or asserting/retracting facts to the database. The facts in the database are expressed in a relational format. The relational format reflects a relationship between objects which have meaning to the program. For example, a fact related to the present preferred embodiment of the invention is "the satellite weight is 10,000 pounds." The fact might be expressed in the form (weight satellite 10,000), where "weight" is the relationship, "satellite" is the object, and "10,000" is the value. No constraints exist on the number of fields in a fact or the ordering of those fields. However, any rules which use a fact must exactly match the format of the facts.

The usefulness of the Rete algorithm is its built-in ability to keep track of all facts asserted in a database and the rules which are currently activated by those facts. The tracking ability of the Rete algorithm allows for groups of rules to be encoded by giving each rule a particular controlling fact. The controlling fact in a rule must match in order for that rule to be activated. The rules in the same group have the same controlling fact. The particular feature of using groups of rules is central to the blackboard implementation of the present invention. Each group of rules is characterized by a "checkpoint" in the software program. A checkpoint is a fact component in a rule. Thus a checkpoint fact has two elements: the word "checkpoint" followed by one of the following: deplex, next-prompt, check-input, error, error-select or error-report. The software incorporated in the general architecture of the present invention cycles through the six checkpoints during its execution for turning on and off the various rule groups.

Figure 12:
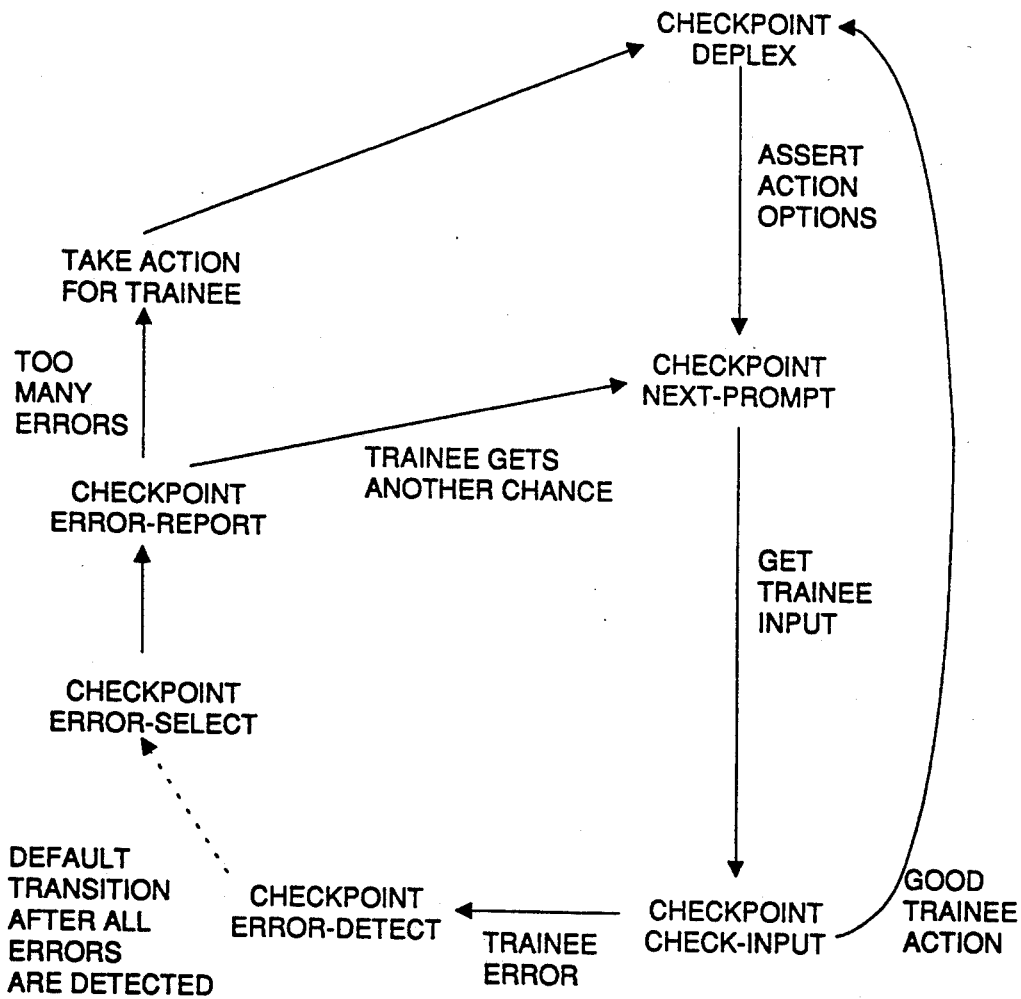
FIG. 12 is a schematic diagram illustrating the training session manager associated with the preferred embodiment of the intelligent computer-aided training system of the present invention.

FIG. 12 illustrates a typical checkpoint scenario. In general, the deplex checkpoint is used by the domain expert rules. The domain expert rules determine the correct, optional, or wrong actions that are "expected" of a trainee at a given point in the process. The next-prompt checkpoint is used when waiting for a trainee input. Once an input is made by the trainee, the input is translated into an internal format for the check input rules. The check input rules match the trainee's action against the predictions of the domain expert and cycle back to deplex checkpoints if the trainee's action is correct. If the trainee's action is incorrect, the error checkpoint is assert to determine the nature of the error. Finally, the error-select and error-report checkpoints are asserted for selecting among the errors found and for reporting a diagnostic message to the trainee.

The checkpoints represent only the control flow of the program. The rules associated with the present system are also divided conceptually. For example, the domain expert rules operate at three checkpoints. Rules for predicting trainee actions are activated at checkpoint deplex. Rules for catching specific trainee errors (which are domain dependent) are activated at checkpoint error. Finally, rules for particular deplex-trainee matching (which are also domain dependent) are activated at checkpoint next-prompt. Thus, while the domain expert rules cover three checkpoints, all the rules refer to domain dependent actions and are considered part of the domain expert.

FIG. 13 is a flow chart illustrating the procedure of the Rete algorithm. Box 401 illustrates the matching of all combinations of facts in the database against the left-hand-side of the rules. The Rete algorithm contains code for matching the facts of the database against the rules antecedent sections. At start up, or anytime thereafter when a new fact is added or removed from the database, the process of matching the fact base against the rule base is repeated. Box 402 represents an agenda of rules which are activated from the matching procedure. Once all the matching is done, an agenda of rules is determined. The agenda is simply a list of the set of rules which are activated by the current set of facts in the database. Any rule which has all of its antecedent patterns successfully matched against facts in the database is added to the agenda. Box 403 determines whether the agenda is empty or not. If the agenda is empty, no rules fire, the Rete algorithm has completed, and the program is terminated. If the agenda is not empty, at least one rule has been activated and can be executed. Box 404 illustrates whether the agenda has more than one rule. If the agenda has only one rule, that rule will be fired. Otherwise a choice must be made as to which of the various activated rules should be fired first. Box 405 indicates the selection of one rule for execution based on priority or random selection. When multiple rules exist on the agenda, one rule must be selected from the group of rules for execution. The Rete algorithm only executes one rule firing between each update of the database. Only one rule is fired because a rule execution may result in the addition or deletion of facts from the database which could change which rules are active. Normally, the rules are given a priority called "salience" which is assigned according to the needs of the program. If the salience priority is not sufficient to determine which rule should be executed, a rule is selected at random from the highest priority rules on the agenda. Box 406 represents the execution of the top rule. Once a single rule is executed the fact base is updated as represented by box 407.

In the following discussion of the deplex rules the checkpoint rules will be addressed by their abbreviated names, i.e., deplex, next-prompt, check-input, error, error-select and error-report rules.

Figure 14:
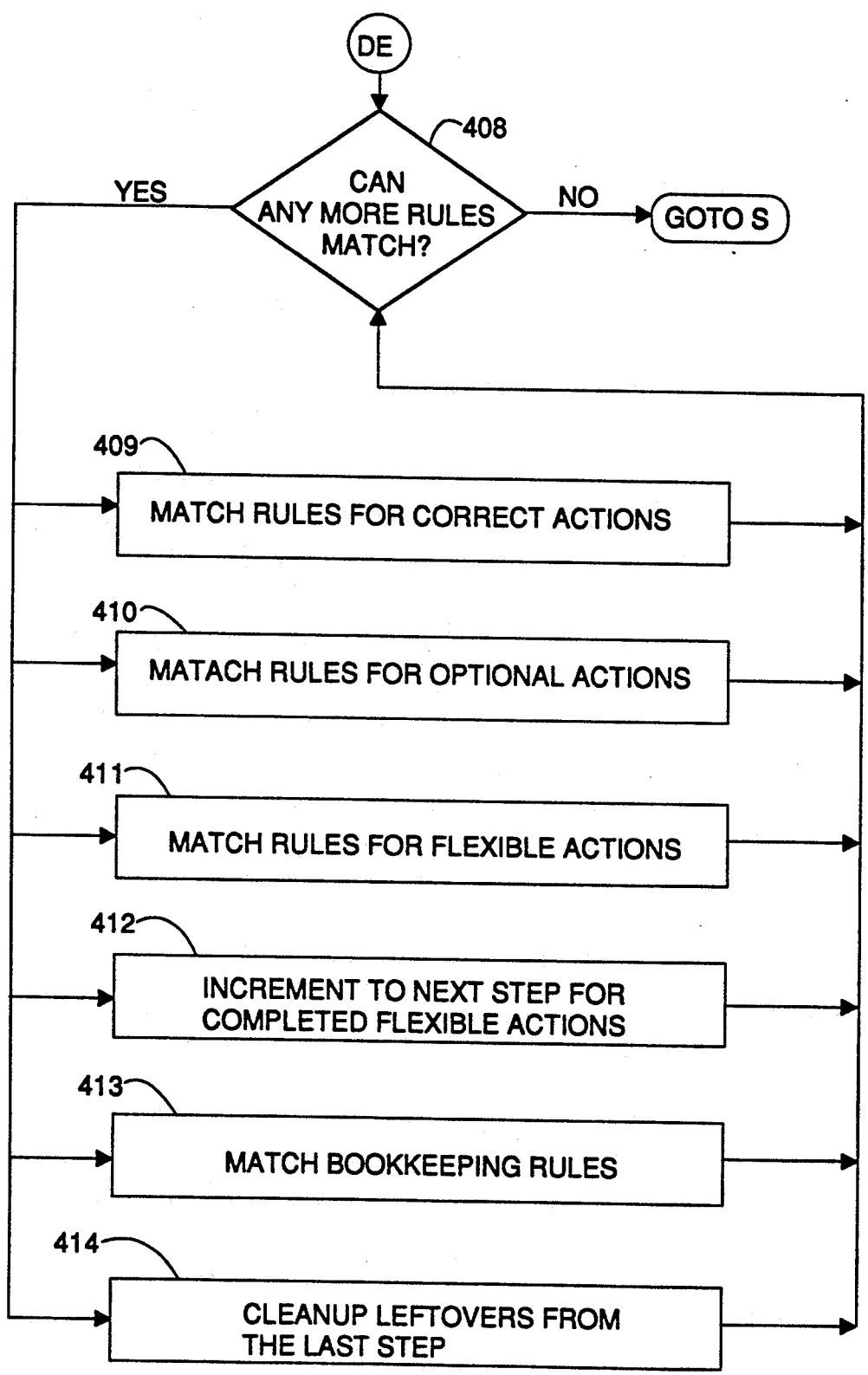
FIG. 14 is a flow chart illustrating rules associated with the domain expert of the preferred embodiment of the general purpose architecture for intelligent computer-aided training system.

FIG. 14 represents a flow chart of the deplex rules. If no deplex rules can fire, the low-salience switching rules take over to assert another checkpoint. Normally such a switch occurs after all of the rules pertinent to the given step of the process have been executed. Thus, when a rule is uncovered having "checkpoint deplex," that rule causes a checkpoint fact to be asserted to the fact base or blackboard. Thus, all of the domain dependent rules which make predictions about the trainee's next action are activated. When those rules stop executing, the next checkpoint fact is asserted. The deplex rules come entirely from the domain expert 10. This step is represented by box 408.

Any rules matching the current fact base which make predictions of correct trainee actions are executed. These rules are triggered not only by the checkpoint fact but also by the facts containing the current step of the process and any pertinent facts derived from previous trainee actions. The training scenario generator 20 may use data in the trainee model 50 to assert facts which can alter the course of the rule activations during the sequence represented by FIG. 14. Consequently, a trainee can be given a variety of experiences with the system through the assertion of different combinations of facts to the database which affect the predictions made by the deplex rules. In fact, because the system is capable of producing multiple predictions at each step of the lesson, the trainee's actions guide the direction taken by the system. (Also, see the prior discussion of the domain expert 10 and the blackboard 60.) This step is represented by box 409.

The matching of rules for optional actions is represented by box 410. Actions taken by the trainee may take several forms. Some of the actions expected by the system are deemed "optional." Optional actions address whether a trainee may or may not perform the given action and still complete the training session. Typical optional actions in the present system involve the trainee double checking his or her previous actions. Such optional actions may still be limited to a particular phase of the training lesson, and can be modified by the trainee model 50.

The deplex rules requiring flexible actions are considered as illustrated in box 411. Flexible actions are required of the trainee. However, flexible actions can be correctly accomplished over a range of time in any particular training session. In other words, flexible actions are required, but at no specific time. Usually a flexible action will have a deadline before which it must be performed. At such time the flexible action changes from being flexible to being required.

In FIG. 14, Box 412 indicates the program incrementing to the next step for completed flexible actions. At the point where a flexible action becomes required, a check must be made to determine whether or not the action has been taken. If it has, the current step is complete and the domain expert 10 need not wait for the trainee before incrementing the next step of the process. The rules incremented by Box 412 check the status of a flexible action at the time it becomes required, and increment the system to the next step of the process if the action has been completed.

There are a number of rules which "clean up" the side effects of other rules which are operating within the system. In general such rules are called "bookkeeping rules." For example, the domain expert 10 makes many predictions about the actions of the trainee at each step. Those predictions which are not pursued by the trainee are left as useless facts on the blackboard 60 if they are not explicitly removed. Any such leftover predictions are removed by rule as indicated by Box 413.

The training session manager 30 has rules which reset the automatic timing of each step, for example, the time taken by the trainee to complete each step is recorded. Also the error handler expert 34 part of the training session manager 30 keeps track of the number of errors made for a given step in the process. The count is reset by the bookkeeping rules when a new step is initiated.

In FIG. 14, the rules associated with boxes 408, 409, 410, 411, and 412 come from the domain expert 10. The rules associated with boxes 413 and 414 come from both the domain expert 10 and the training session manager 30.

Figure 15:
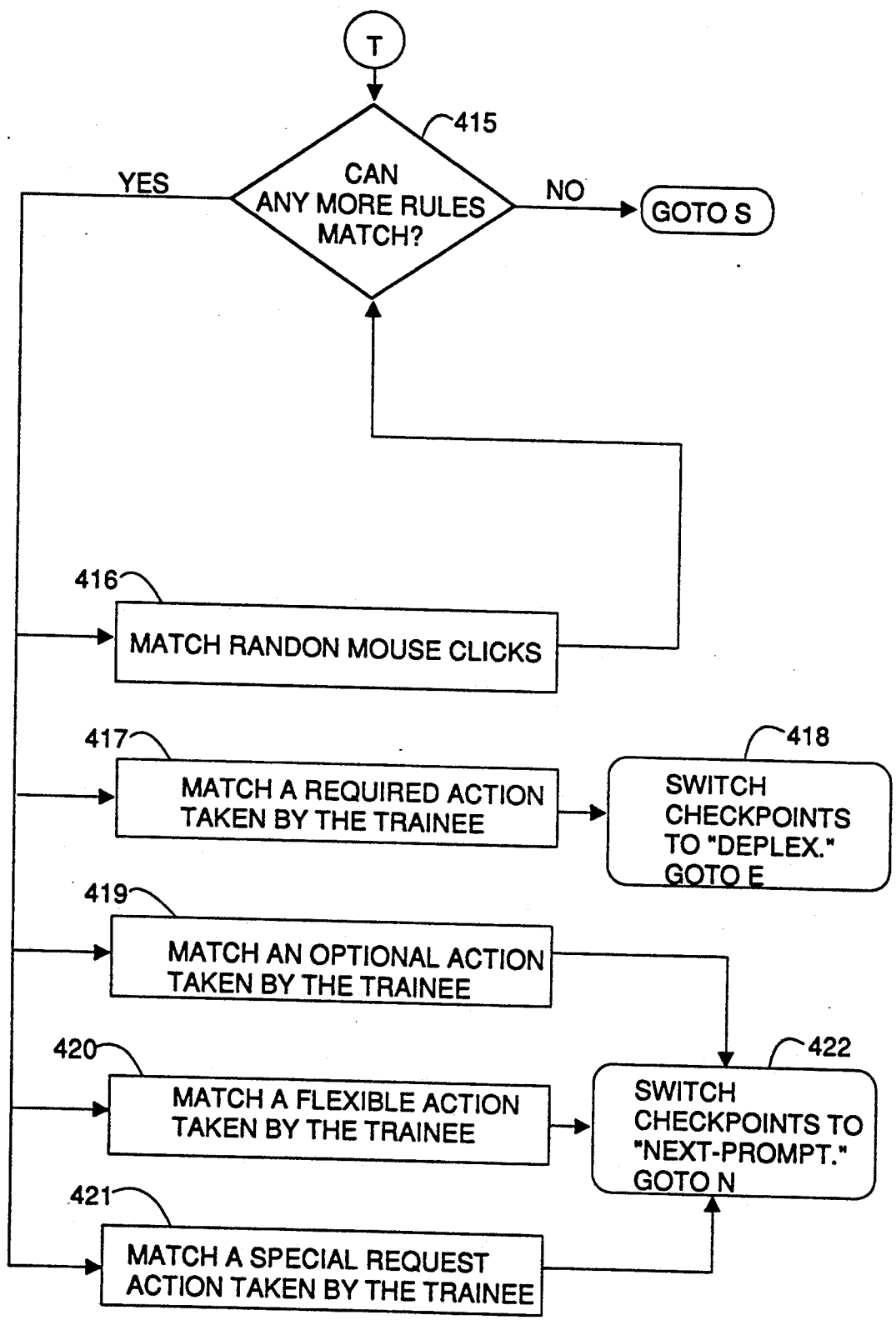
FIG. 15 is a flow diagram illustrating the check-input rules associated with the preferred embodiment of the general purpose architecture for intelligent computer-aided training of the present invention.

FIG. 15 is a flow chart illustrating the use of check-input rules. Diamond 415 acts to determine if any additional rules can be matched. If no training session manager rules are activated, the system automatically defaults to the context switching rules which move to the next checkpoint. Normally this will not happen and the procedure is provided only for the default case. Typically the training session manager 30 switches back to another checkpoint (see boxes 18 and 22). The object is to match the trainee's action against a prediction from the domain expert 10 if at all possible. If such a matching is not possible, the trainee must have made an error and the system will switch to error rules by default.

The diamond 415 detects if any more rules will match. If diamond 415 indicates there are more rules to match, then they will be of the type specified in boxes 416 through 420. If not, then the context switching rule (i.e., "Go to S") gets called. If the trainee has made spurious inputs, usually by mistake, that have no meaning to the system of the present invention, such inputs must be removed from the blackboard 60. Box 416 represents a set of rules which identify such spurious inputs which are unrecognized by the system. Box 416 provides that such inputs are removed from the system and control returned to the diamond 415 to determine if additional rules can be matched.

Boxes 417 and 418 illustrate a match of a trainee assertion and the switch to the deplex rules, respectively. Box 417 matches correct trainee actions. The training session manager 30 has generic correct-action matching rules and the domain expert 10 has specific matching rules. If a trainee's action is correct, the system records the action taken and increments the step before passing control back to the domain expert 10 via the deplex rules.

Boxes 419 and 420 represent the matching of an optional action or a flexible action taken by the trainee, respectively. These two groups of rules are similar to the rules of box 417. The rules differ from the rules that match a required action (box 417) in that they match optional or flexible trainee actions as represented in boxes 410 and 411, respectively. When optional or flexible actions are matched, the trainee has not actually completed the step. The training session manager 30 simply records the action taken and passes control back to the input rules to get another trainee action. The step number in the control structure is not incremented by the application of the rules associated with boxes 419 and 420. The rules matched pursuant to boxes 419 and 420 are from the training session manager 30 if they represent generic matches and are derived from the domain expert 10 if they are from specific matches.

Box 421 of FIG. 15 illustrates the process of matching a special request action taken by the trainee. The trainee may make special requests of the system at any point in the training session. Such requests include asking for help, looking at the current status of the lesson, or requesting any specific data which accompanies the lesson, for example, the characteristics on the satellite being deployed in the preferred embodiment of the general purpose architecture of the present invention. The rules associated with the box 421 match the special request and either perform the requested action or spawn a side effect fact to perform the requested action. (See below, discussion of side effect rules and boxes 451–457). The rules utilized by box 421 come from the training session manager 30. Box 422 receives matched information with respect to optional actions, flexible actions or special requests and switch checkpoints to the next-prompt rule. After matching an optional action 19, a flexible action 20, or a special request 21, control is transferred back to the input rules by changing checkpoints to "next-prompt." The rules associated with box 422 are derived from the training session manager 30.

Figure 16:
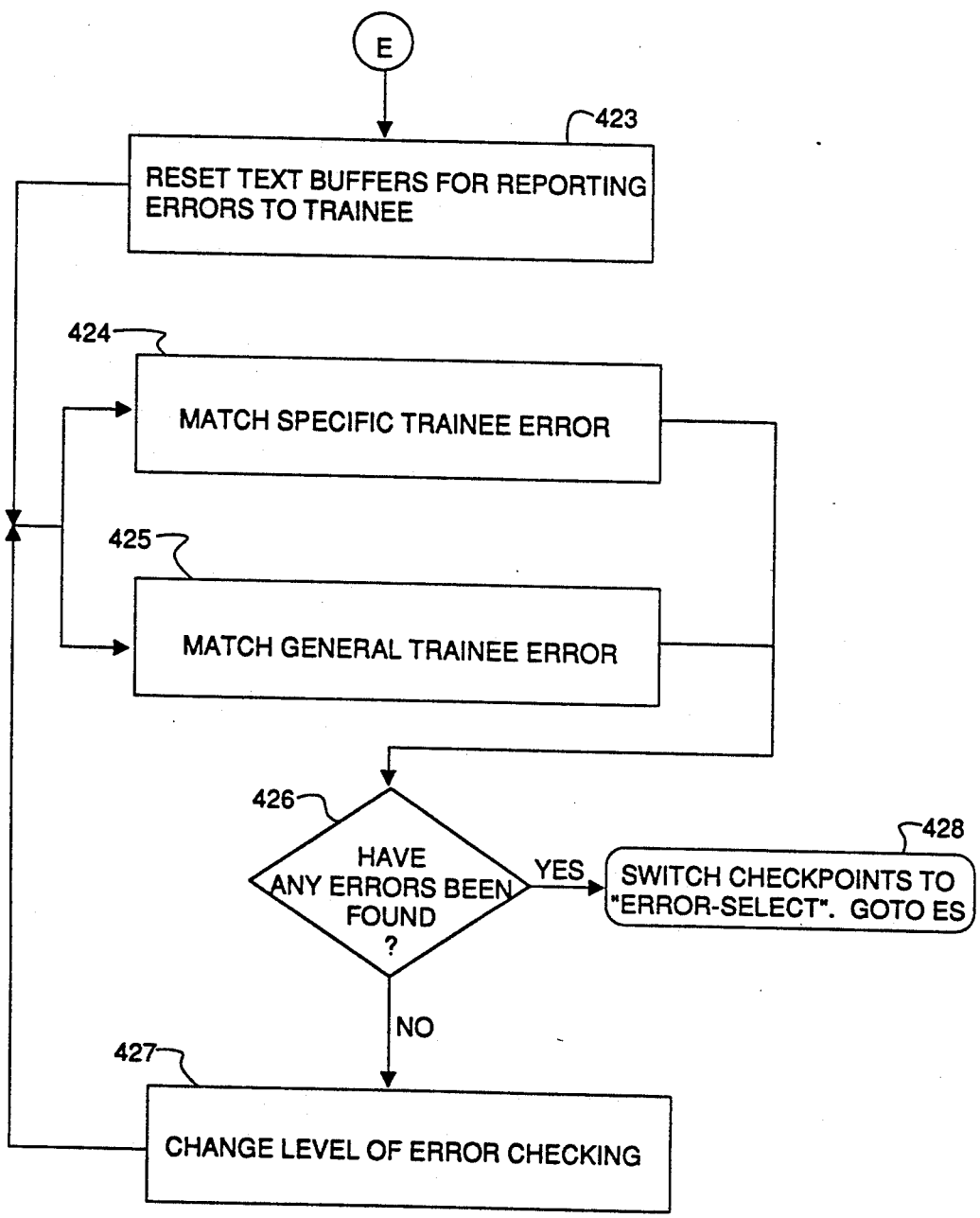
FIG. 16 is a flow chart of the error-detect rules associated with the preferred embodiment of the general purpose architecture for intelligent computer-aided training of the present invention.

FIG. 16 is a flow chart illustrating the error rules. The error rules begin by resetting the text buffers for reporting errors to the trainee as reflected in box 423. The error handler expert 34 of the training session manager 30 begins by first clearing out any buffers used to hold the text printed to the trainee. The rules associated with box 423 come from the training session manager 30.

Thereafter, specific trainee errors and general trainee errors are matched as indicated in boxes 424 and 425, respectively. Two different types of rules can match a trainee's erroneous input. The first of these types come from the domain expert 10 and detect specific errors which are typically made by trainees at a given step of the training session as indicated in box 424. If the trainee's input does not match a specific error, the training session manager 30 will match the input as a general error. The general errors are categorized as having either a bad action or a bad parameter.

After a specific or general trainee error has been matched, it is determined whether any errors have been found and a change is implemented in the error checking as reflected in boxes 426 and 427, respectively. If no errors are found, the system changes error levels and repeats the checking process. Every action in the system is viewed in the general form (action: parameter 1:

parameter 2: . . . parameter N). In the general case, each parameter may consist of its own parameter(s). The error level measures how deeply into the action the error-handler rules are checked for errors. The system starts at the top level, and continues downward by expanding parameters until an error is found. The result is that the most general error in the action is detected first. The system is guaranteed to find at least one error since it will report an unknown action error at the bottom-most level.

Once an error is found, the training session manager 30 stops checking for errors and switches to the error-section phase of the program as indicated in box 428. Several errors could be simultaneously found at a given level before switching to error-select.

Figure 17:
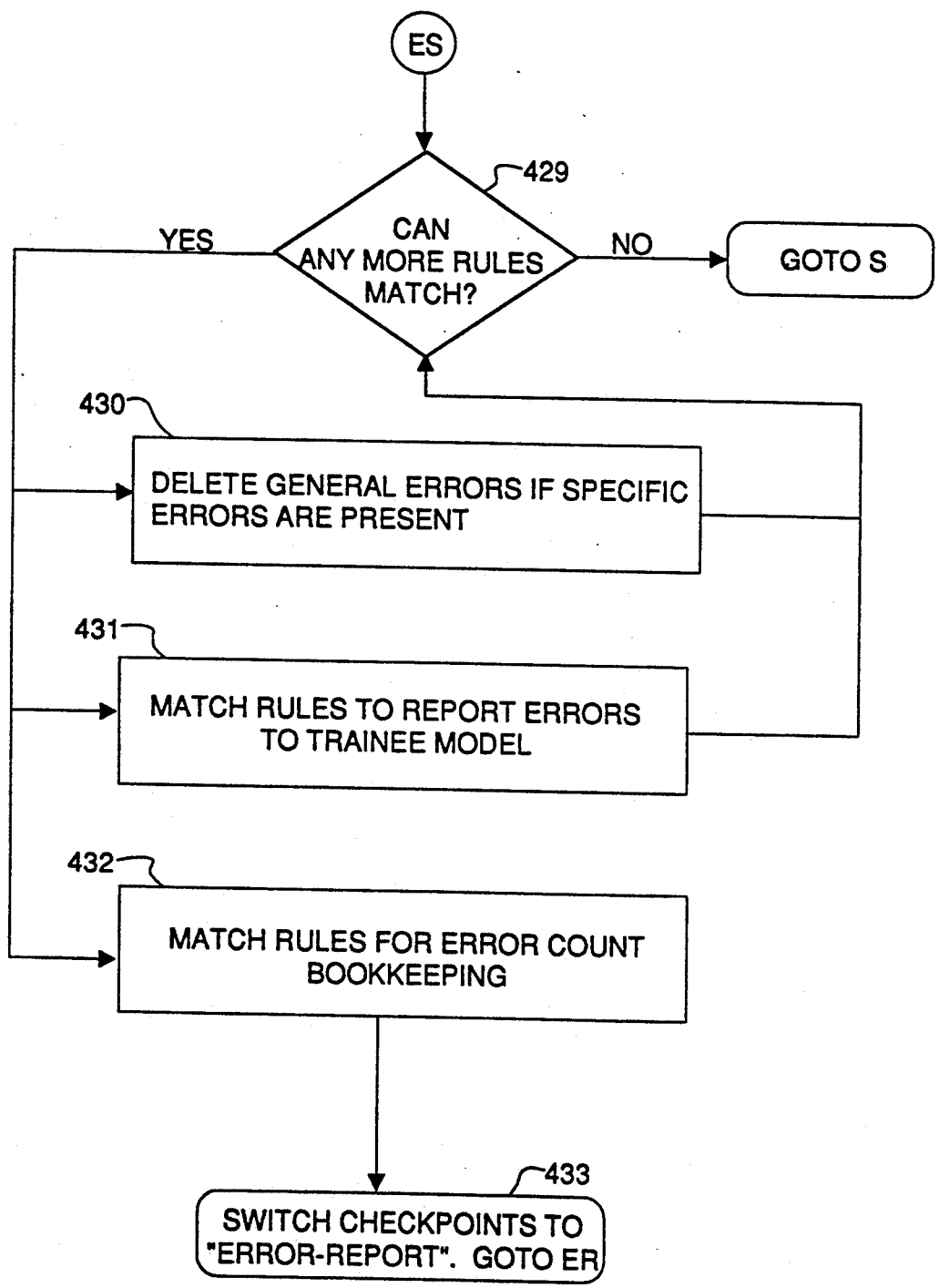
FIG. 17 is a flow chart illustrating the error-select rules associated with the preferred embodiment of the general purpose architecture for intelligent computer-aided training using the present invention.

FIG. 17 illustrates the use of error-select rules. If there are no rules left to match for error selection, the system defaults to the context switcher section of the code which changes the checkpoint as indicated in box 429. If more than one error has been found by the system, the errors are reduced to one as indicated by box 430. Multiple errors occur when one general and one specific error are found at the same level of checking. In such an event the general error is removed from the fact database. All errors made by the trainee are reported to the trainee model 50. The error reporting is done by matching on an error and altering its format for submission to the trainee model 50 as indicated box 431. The training session manager 30 keeps track of how many errors are made for each step of the training session so that each error is counted separately. The errors recorded are kept in the blackboard 60 or fact database during error detection for use in generating an appropriate response to the trainee. When the step is incremented by a correct trainee action, the counts are all deleted as reflected by boxes 413 and 414. Once an error has been detected and the count incremented, the checkpoint is changed to "error-report" for reporting the error to the trainee as indicated in box 433.

Figure 18:
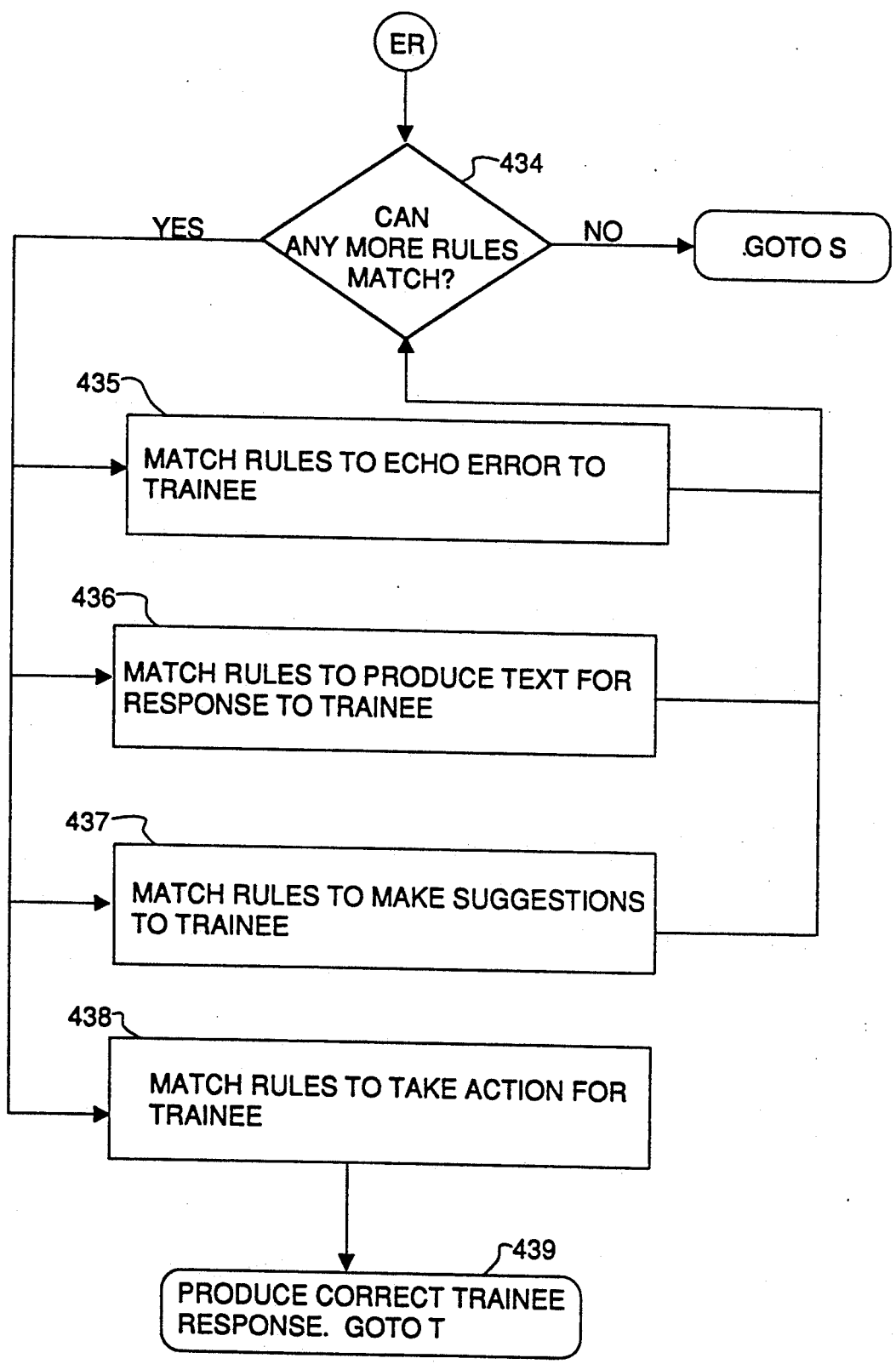
FIG. 18 is a flow chart illustrating the error-report rules associated with the preferred embodiment of the general purpose architecture for intelligent computer-aided training using the present invention.

FIG. 18 is a flow chart illustrating the procedure of the error-report rules. Box 434 indicates that, if no more rules can be matched, transfer is made to the switching rules, otherwise, if additional rules can be matched, the error-report rules continue. When the error is found, the action taken which caused the error is repeated for the trainee. Box 435 represents the match rules which provide context for the textual messages which will be displayed to the trainee. Based upon the information in the trainee model 50, the contents of the error made, and the status of the count variable (per box 432), the system prints a diagnostic message to the trainee. The diagnostic message printed to the trainee is formatted text supplied to a print-out buffer which is then dumped to the screen (see box 423). At various points in the training session, the training session manager 30 may print extra diagnostic messages suggesting actions which the trainee might take as represented by box 437. The suggesting messages might imply that the automatic help feature be turned on or off, depending on the number of errors made by the trainee. The current total number of errors made by the trainee will include those made in the current session and may be dependent on errors from past sessions as well. The trainee may follow these suggestions or not without any penalty or ramifications with respect to the task being performed. When the trainee makes a predetermined number of errors, the system automatically initiates the proper action for the trainee. The initiated proper action is provided so that the trainee can get an example of the action which was expected of him or her at the current step. The number of errors which cause such example actions to be taken can be set either by the authors of the system or by the training scenario generator 20. In general, the error reporting defaults back to the checkpoint next-prompt to get the next trainee input as indicated in box 439. However if an action is taken for the trainee by the system, it is asserted as a normal trainee action. The system is then switched to checkpoint check-input where the action will be matched in the usual way (see FIG. 15).

Figure 19:
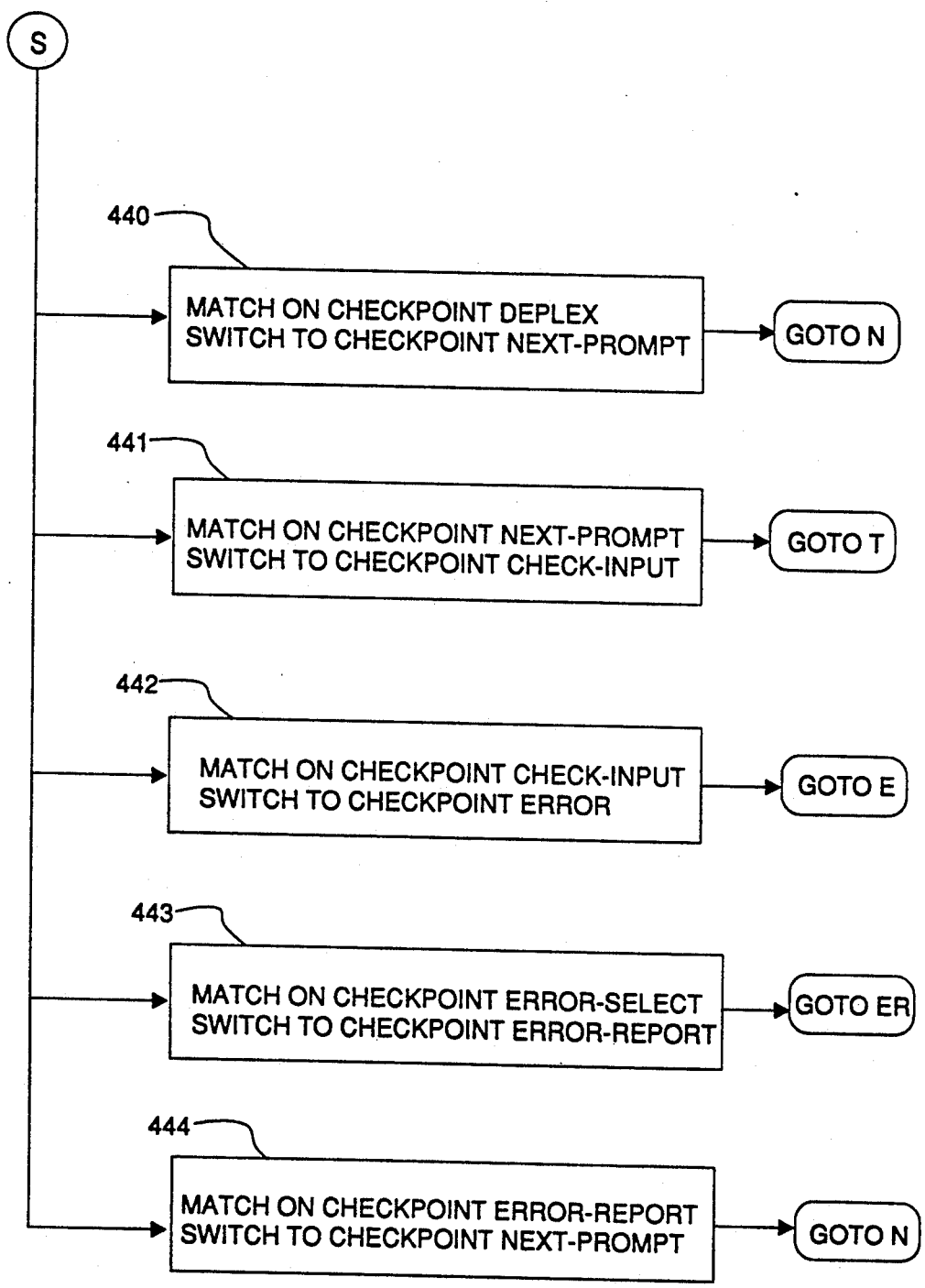
FIG. 19 is a schematic flow chart illustrating the switching rules associated with the preferred embodiment of the general purpose architecture for intelligent computer-aided training of the present invention.

FIG. 19 is a flow chart illustrating the application of the switching rules. All of the rules associated with switching and represented by boxes 440, 441, 442, 443, and 444 are similar in nature. Each is given the task of detecting a particular fact, which it removes from the blackboard 60 and produces a new fact. There is no switching rule for error-select rules. The error checking process is guaranteed to find at least one error, at which point error-select is asserted. Thus, no switcher is needed to go from error to error-select since an error can always be found by default and the switch from error to error-select can, consequently, always be generated by default. Furthermore, the error checking rule must be turned off as soon as one error is found, since there is no point in finding errors at lower levels once an error is detected.

Figure 20:
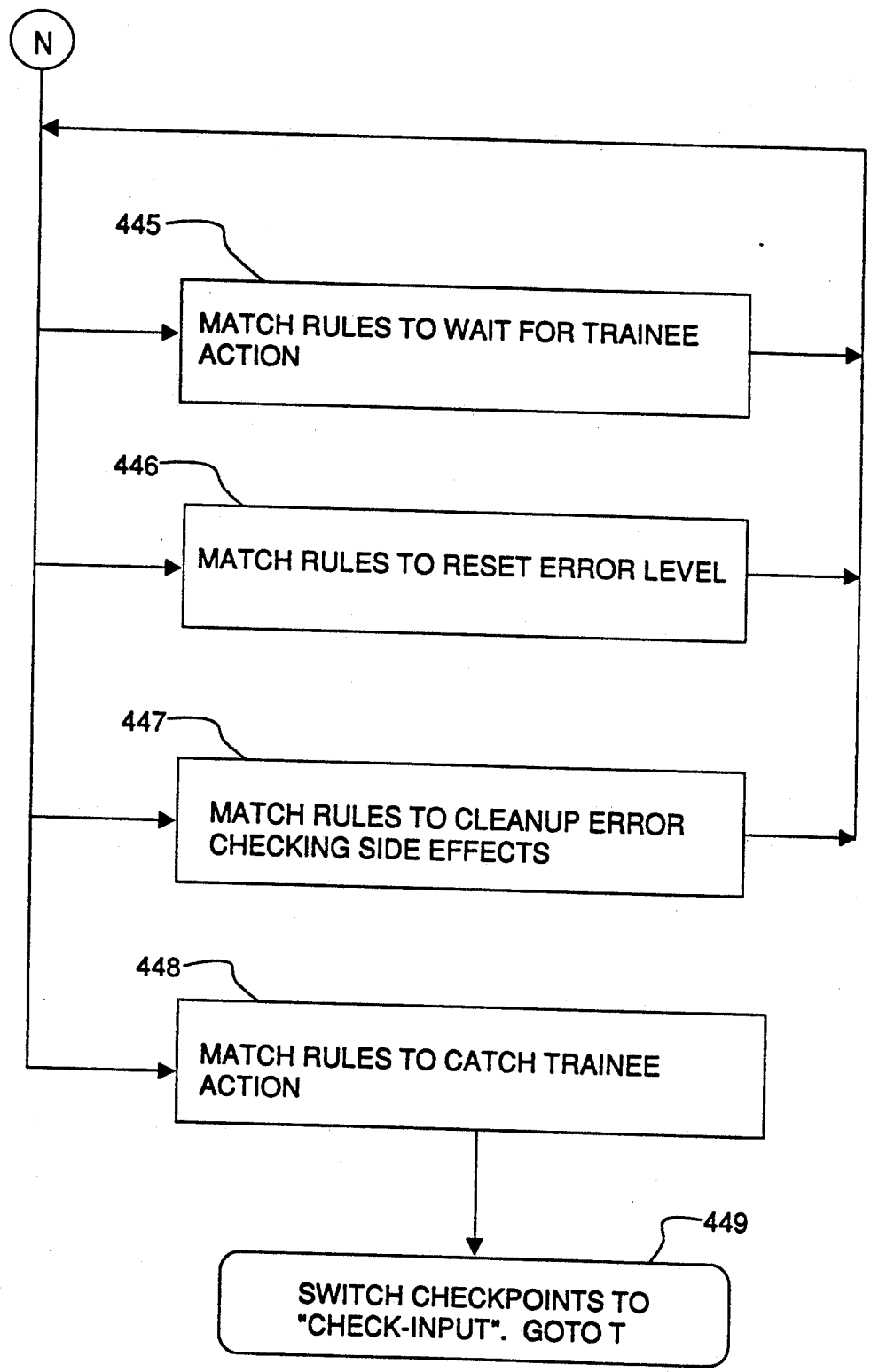
FIG. 20 is a schematic flow chart illustrating the next-prompt rules associated with the preferred embodiment of the general purpose architecture for intelligent computer-aided training of the present invention.

FIG. 20 is a flow diagram illustrating the next-prompt rules. In order to keep the system running, rules must be kept on the agenda. The system cannot be allowed to stop firing rules while it waits for the trainee to make an input. Thus a wait rule is defined which does nothing but loop itself while the trainee makes his or her input. The wait rule if reflected by box 445. Each time a new action is sought from the trainee, the error level (see box 427) is reset. The utilization of the reset mechanism represented in box 446 insures that each new action is checked for errors starting with the top most level.

While checking for errors, the system produces many side effects in the form of facts. The system chops each trainee action and each domain expert prediction into pieces. One piece is for each possible level of error checking (see box 427). These facts are only useful during one error check, and must be thrown away to keep the blackboard 60 clean. When the trainee is prompted for a new action, the side effects from the last action are deleted as represented by box 447. Any action taken by the trainee is asserted to the fact base from the user interface. The form presented by the interface must be converted into the proper fact format to be recognized by the rest of the rules in the system. Once the conversion is done, the trainee is considered to have performed an action and the system is switched to check-input rules.

Figure 21:
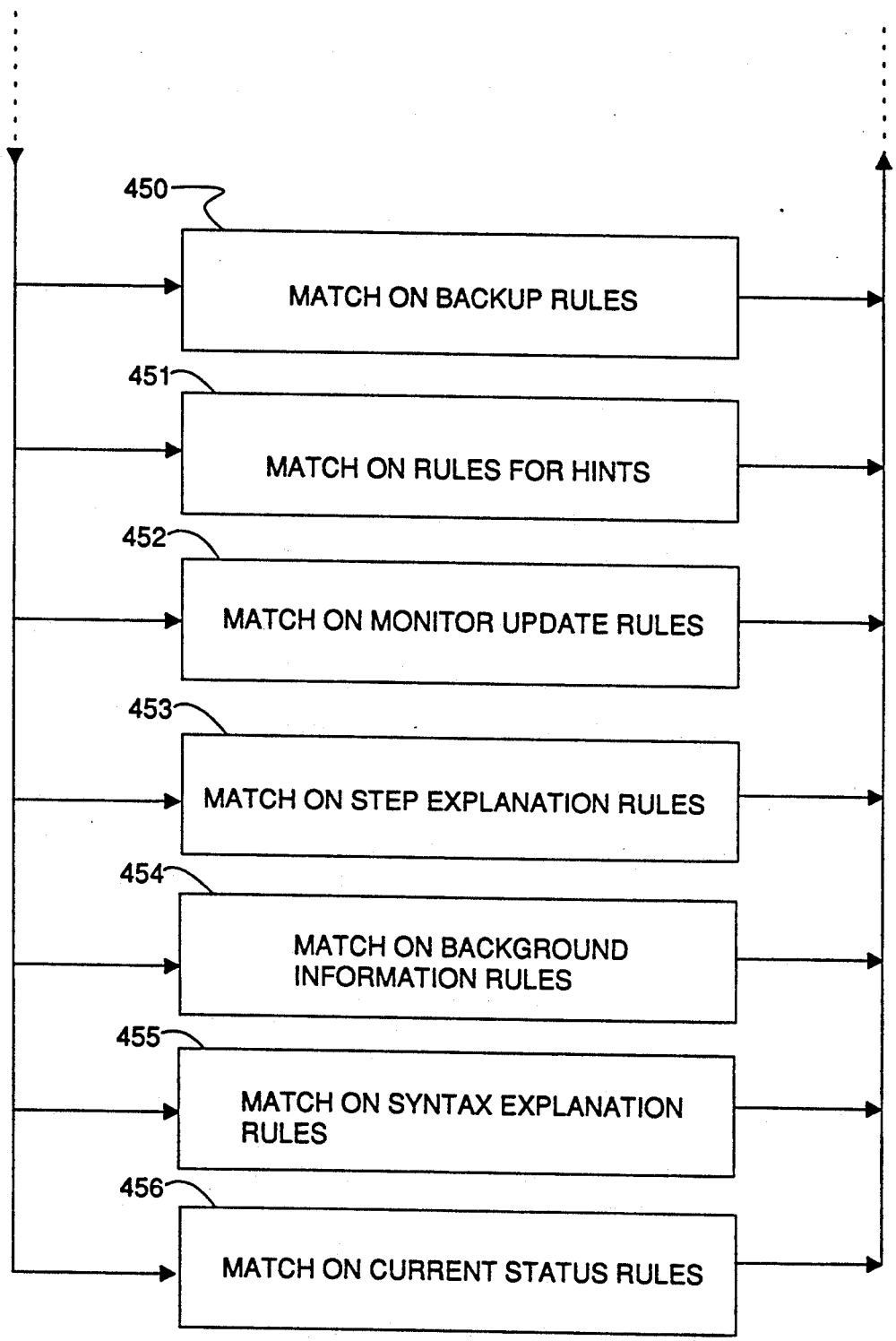
FIG. 21 is a schematic flow chart illustrating the side effect rules associated with the preferred embodiment of the general purpose architecture for intelligent computer-aided training of the present invention.

FIG. 21 is a flow chart illustrating the utilization of the side effect rules. FIG. 21 represents the groups of rules which can be activated at any time during the program. The side effect rules do not depend upon any checkpoint. Instead, they are spawned as side effects of other rules which are triggered during the normal course of the training session. Box 450 contains rules to backup the system when the user requests a backup. These rules momentarily take over control of the system, erase all facts in the blackboard 60 back to the desired step, and, then, restart the system. When the trainee asks for hints about which action to take, the side effect rules fire as indicated in box 451. The rules provide that the blackboard 60 is scanned by matching on the current predictions made by the domain expert 10. Such predictions are collected and printed out to the trainee. Many of the trainee's actions will involve the user interface 40. The user interface 40 has, among other things, graphical representations of the types of monitors, gauges, windows, etc. used in performing a particular task. Actions taken by the trainee may lead to updates of the representations which are accomplished by side effect rules as represented by box 452. When a side effect is asserted, the appropriate rules match the side effect and call the supporting code for updating the user interface 40. The given rule may also match on other facts on the blackboard 60 for information needed by the support code, i.e., the routines that drive the window displays and calculate data to be inserted into the window displays. When the trainee requests an explanation of the current step, the rules for the explanation are activated as indicated by box 453. The explanation rules match on the current context of the lesson and supporting code to access the appropriate textual explanation. In the present preferred embodiment of the present invention, the supporting code means a list of pairs (e.g., step and explanation) plus a routine for retrieving the explanation text given the step number. These rules are part of the training session manager 30, though the text printed out by the supporting code is part of the domain expert 10. The side effect rules collect all information particular to the current lesson (see box 421) and display the results to the trainee as indicated in box 454. The side effect rules for syntax explanation are identical to those used for explaining the current step except that syntax is described instead, where syntax refers to the manner in which an action is entered into the system. Some actions take several arguments, thus there is "explain syntax" help facility to indicate the details of parameters. The syntax explanation rules match on the current context and call the appropriate supporting code to print out textual information on the syntax of a given action. The syntax explanation rules, as represented by box 455, are part of the training session manager 30 and the supporting code which is invoked part of the domain expert 10. The current status rules are matched as indicated in box 456. The current status rules give the trainee access to a short summary of the current state of the training session. This short summary provides an overall look at the tasks accomplished so far, and the current time elapsed.

What is claimed is:

1. A computerized intelligent training system adaptable for use in the training of a trainee having a current skill level in the performance of at least one of a plurality of training tasks within a specific task environment, where the performance of each task comprises performance of certain procedural steps called actions such that each task has at least one desired action called a correct action and training is accomplished using the system by having the trainee perform simulated task by performing simulated actions on a computer, the computer system comprising:

(a) user interface means for simulating the task environment for which the trainee is being trained and for enabling interaction between the trainee and the system;
 (b) domain expert means for performing a simulated task and achieving the correct actions for the task;
 (c) training session manager means comprising,
  (1) error detection means for error detection, an error being a failure of match between an action taken by a trainee, called a trainee action, with a correct action, whereby error detection is made in a hierarchical manner with relatively higher level errors, including a highest level error, distinguished from relatively lower level errors, and p2 (2) error handling means for providing information concerning actions and errors, said information concerning errors being based on the highest level error detected;
 (d) training scenario generator means for designing increasingly complex training tasks based on the current skill level of the trainee and on any weaknesses or deficiencies that the trainee has exhibited in previous trainee actions, where such weaknesses or deficiencies are based on comparing the trainee actions with the correct actions from said domain expert;
 (e) trainee model means for accepting from said training session manager information concerning correct actions and errors made as a result of trainee actions and compiling a complete record of the correct actions taken and errors by the trainee and, at the conclusion of each training session, creating a training summary of such correct actions and errors as well as the time taken to complete the session and the type of assistance provided by the system to the trainee; and
 (f) blackboard means providing an intermodule interface for communicating between said user interface means, said domain expert means, said training session manager means, said training scenario generator means, and said trainee model means; said blackboard means also providing an intermodule interface for transferring control of the training system from one to another of said domain expert means, said training scenario generator means, said error detection means and said error handling means by use of rules contained within each of said domain expert means, said training scenario generator means, said error detection means and said error handling means.

2. The system as defined in claim 1 wherein said domain expert is capable of performing the task to be trained by using rules effecting correct actions and includes rules identifying typical errors.

3. The system as defined in claim 2 wherein said domain expert comprises production rules.

4. The training system as defined in claim 1 wherein said domain expert generates a plurality of correct actions any of which could lead to accomplishment of a particular training task so that any trainee action which could lead to accomplishment of the particular training task is a correct trainee action.

5. The system as defined in claim 4 wherein said blackboard means accepts facts from said training scenario generator to establish the context of a training scenario.

6. The system as defined in claim 4 further comprising a database containing a range of typical procedural steps describing the training context and problems of graded difficulty from which new training scenarios are built.

7. The training system as defined in claim 1 wherein said training session manager compares the actions by said domain expert and by the trainee for evaluating such trainee actions and provides guidance to the trainee which is appropriate to acquired skill level of the trainee.

8. The system as defined in claim 1 wherein said training scenario generator uses information concerning correct actions and errors made as a result of trainee actions in said trainee model for creating a unique scenario for the trainee whenever a new session begins.

9. The system as defined in claim 1 wherein said training scenario generator examines said trainee model and said database in order to create a unique scenario for the trainee whenever a new training session begins.

10. The system as defined in claim 1 wherein said training scenario generator builds training scenarios of greater difficulty as the trainee demonstrates the acquisition of greater skills.

11. The system as defined in claim 1 wherein said domain expert provides a plurality of error texts that allows said error detection means in said training session manager to write appropriate error messages to the trainee through said user interface.

12. The system as defined in claim 1 wherein said trainee model accepts from said training session manager information comprising trainee history including previous correct actions and errors made as a result of trainee actions, where such history may comprise summaries of such information, records the trainee actions, updates trainee history, and provides such information to said training scenario generator to produce new training scenarios.

13. The system as defined in claim 1 wherein said domain expert includes rules identifying typical errors made by a trainee and trainee error messages relating to said typical errors, whereby, upon performance of a trainee action which includes an error, said training session manager selects from said hierarchy of errors said highest level error and provides an error message for the trainee which is appropriate for the trainee's current skill level.

14. The system of claim 1 wherein said user interface means, said domain expert means, said training session manager means, said training scenario generator means, and said trainee model means all contain control rules in the form of production rules; whereby, control of the system may be transferred from one to another of said user interface means, said domain expert means, said training session manager means, and said training scenario generator means.

15. The system of claim 14, wherein said control rules may cause facts to be posted to the blackboard means by any of said user interface means, domain expert means, training session manager means, training scenario generator means, and said trainee model means.

16. The system of claim 15 wherein said facts may be read by any of said user interface means, domain expert means, training session manager means, training scenario generator means, and trainee model means.

17. The system of claim 16, whereby control of the system is transferred to the one of said user interface means, domain expert means, training session manager means, training scenario generator means, and trainee model means which can fire one of its said control rules from said facts posted to said blackboard means.

18. The system of claim 14 wherein said control rules include at least one standard match rule which changes the step, called the context, of the training task.

19. The system of claim 14 wherein said control rules include at least one input conversion rule which converts the trainee's action into a format required by the system.

20. The system of claim 14 wherein said control rules include at least one clean-up rule which deletes facts from the blackboard that are no longer needed by the system.

21. The system of claim 14 wherein said control rules include at least one backup control rule which reconstructs a previous context.

22. The system of claim 14 wherein said control rules include at least one iteration rule which reconstructs a previous sequence of action contexts.

23. The system of claim 14 wherein said control rules include at least one special-match rule which under appropriate conditions omits certain steps in a training task.

24. The system of claim 14 wherein said control rules include at least one outside-request rule which responds to trainee's request for help or information.

25. The system of claim 14 wherein said control rules include at least one context-switching rule which changes control of the system from one of said user interface means, domain expert means, training session manager means, training scenario generator means, and trainee model means to a different one of said user interface means, domain expert means, training session manager means, training scenario generator means, and trainee model means.

26. A computerized intelligent training system adaptable for use in training persons, called trainees, in the performance of training tasks in a specific task environment, the computer system comprising a plurality of modules, each module comprising a set of production rules, said rules of the various modules acting in concert to implement the system, wherein said modules communicate with each other via an intermodule interface by means of messages sent in accordance with a message passing protocol, wherein all of said modules may write facts to said intermodule interface and all of said modules may read facts from said intermodule interface, and wherein each said message, to comply with said message passing protocol, contains facts indicating which of said modules sent the message and which of said modules is to receive the message.

27. The system of claim 26 wherein control of said system at any given time is performed by control rules contained within a first of said modules and whereby said control rules transfer control of the system to any second of said modules by writing messages to said intermodule interface in accordance with said message passing protocol.

28. The system of claim 27 wherein control of said system is transferred from said first to said second module, said second module being the module having a rule which can be fired by facts written to said intermodule interface by said first module.

29. The computer implemented method of training a trainee having a skill level to perform actions necessary to accomplish the training steps of a training task in a specific task environment, the trainee performing trainee actions at various times in the training, the various actions being represented by rules, the method using a computer having modules comprising sets of rules and including an intermodule interface to which facts may be written by modules and from which facts may be read by other modules, comprising the steps;

(a) writing to the intermodule interface predetermined correct, optional, and typical error actions;

(b) waiting for a trainee action;
(c) comparing the trainee action with the predetermined correct, optional and typical error actions;
(d) continuing to the next training step if the trainee action matches the predetermined correct action or a predetermined optional action;
(e) determining a specific error if trainee action matches a predetermined typical error action;
(f) reporting an error message to trainee appropriate for the trainee's skill level;
(g) recording the specific error for use in both trainee and system evaluation;
(h) performing each step by use of one or more of said modules; and
(i) transferring control of the process from a first to a second of said modules by use of rules contained in any said first module, whereby said transferring of control is accomplished by writing facts to said intermodule interface by said first module and reading therefrom by any said second module.

* * * * *